(12) United States Patent
Brommer et al.

(10) Patent No.: US 6,826,140 B2
(45) Date of Patent: Nov. 30, 2004

(54) MULTICHANNEL DIGITAL RECORDING SYSTEM WITH MULTI-USER DETECTION

(75) Inventors: Karl D. Brommer, Hampton Falls, NH (US); Robert B. MacLeod, Nasuha, NH (US); Michael P. Schmidt, Hollis, NH (US)

(73) Assignee: BAE Systems Information and Electronic Systems Integration INC, Nashua, NH (US)

( * ) Notice: Subject to any disclaimer, the term of this patent is extended or adjusted under 35 U.S.C. 154(b) by 82 days.

(21) Appl. No.: 10/251,187

(22) Filed: Sep. 20, 2002

(65) Prior Publication Data

US 2004/0037202 A1 Feb. 26, 2004

Related U.S. Application Data

(63) Continuation-in-part of application No. 10/228,787, filed on Aug. 26, 2002.

(51) Int. Cl.[7] .................................................. G11B 7/00
(52) U.S. Cl. ................. 369/94; 369/47.19; 369/124.02; 369/124.04; 369/59.22
(58) Field of Search ............................. 369/94, 95, 96, 369/97, 124.02, 124.03, 124.04, 124.05, 59.13, 59.2, 59.21, 59.22, 59.26, 59.27, 47.16, 47.18, 47.19, 44.37, 44.38; 360/46, 48, 63, 67, 58

(56) References Cited

U.S. PATENT DOCUMENTS

| | | |
|---|---|---|
| 4,549,232 A | 10/1985 | Axmear et al. |
| 4,945,536 A | 7/1990 | Hancu |
| 5,285,439 A | 2/1994 | Clemens |
| 5,307,217 A | 4/1994 | Saliba |
| 5,371,638 A | 12/1994 | Saliba |
| 5,402,399 A * | 3/1995 | Oshiba et al. ............ 369/44.28 |

(List continued on next page.)

OTHER PUBLICATIONS

Gallager, R.G., Low-Density Parity-Check Codes, IRE Transactinos on Information Theory Jan. 1962, pp. 21-28.

Barbosa, Lineu C., Simultaneous Detection of Readback Signals from Intefering Magnetic Recording Tracks Using Array Heads. IEEE Transactinos on Magnetics vol. 26, No. 5, Sep. 1990, pp. 2163-2165.

Vea, Mathew P., and Moura, Jose, M. F., Magnetic Recording Channel Model with Interack Interference, IEEE 1991, pp. 4834-4836.

Tsang, Chen, Yogi Gigabit-Density Magnetic Recording, IEEE vol. 81 No. 9, Sep. 1993.

Moon, Jaekyun, The Role of SP in Data Storage, IEEE Signal Processing Magazine, vol. Jul. 1998., No. 5 pp. 54.

(List continued on next page.)

*Primary Examiner*—Thang V. Tran
(74) *Attorney, Agent, or Firm*—Maine & Asmus

(57) ABSTRACT

A processing scheme for digital storage media using multi-user detection to separate tracks of data or remove interference from neighboring tracks. In one embodiment, data is written on a plurality of tracks positioned sufficiently close together so that multiple tracks are detected simultaneously by the read access sensor. Upon scanning the surface for data, the read element simultaneously receives the data signals from a plurality of tracks. Joint detection signal processing resolves the interference and data bits from the multiple sensed tracks, enabling closer packing of data with minimal guard space.

41 Claims, 14 Drawing Sheets

U.S. PATENT DOCUMENTS

| | | | |
|---|---|---|---|
| 5,448,514 | A | 9/1995 | Cho et al. |
| 5,543,861 | A | 8/1996 | Harradine et al. |
| 5,555,142 | A | 9/1996 | Komai et al. |
| 5,748,592 | A * | 5/1998 | Hino et al. ............... 369/59.18 |
| 5,818,806 | A | 10/1998 | Wong et al. |
| 5,854,714 | A | 12/1998 | Reed et al. |
| 5,949,604 | A | 9/1999 | Saliba |
| 5,956,196 | A | 9/1999 | Hull et al. |
| 5,959,953 | A * | 9/1999 | Alon ..................... 369/124.02 |
| 5,995,461 | A | 11/1999 | Sedlmayr et al. |
| 5,995,561 | A | 11/1999 | Yamaski et al. |
| 6,031,672 | A | 2/2000 | Bergquist et al. |
| 6,122,134 | A * | 9/2000 | Kaaden et al. ................ 360/48 |
| 6,122,269 | A | 9/2000 | Wales |
| 6,137,763 | A * | 10/2000 | Dahan et al. .................. 369/95 |
| 6,150,964 | A | 11/2000 | McLaughlin |
| 6,181,505 | B1 | 1/2001 | Sacks et al. |
| 6,222,833 | B1 | 4/2001 | Seo |
| 6,247,156 | B1 | 6/2001 | Kim |
| 6,266,712 | B1 | 7/2001 | Henrichs |
| 6,304,400 | B1 * | 10/2001 | Schneider .................... 360/46 |
| 6,318,633 | B1 | 11/2001 | Drexler |
| 6,373,648 | B2 | 4/2002 | O'Conner |
| 6,377,529 | B1 | 4/2002 | Lee et al. |
| 6,381,210 | B1 * | 4/2002 | Alon et al. ............ 369/124.02 |
| 6,567,364 | B1 * | 5/2003 | Takahashi et al. ............ 369/95 |
| 2001/0024335 | A1 | 9/2001 | Blaum et al. |
| 2002/0037061 | A1 | 3/2002 | Learned |
| 2002/0037737 | A1 | 3/2002 | Learned et al. |

OTHER PUBLICATIONS

Soljanin, Emina & Georghiades, Costas N., Multihead Detection for Multitrack Recording Channels, IEEE Transactions on Information Theory, vol. 44, No. 7, Nov. 1998, pp. 2988–2997.

Oenning, T. and Moon, J., Modeling the Lorentzian Magnetic Recording Channel with Transition Noise, IEEE Transactions on Magnetics, vol. 37, Jan., 2001, p. 583.

Kurtas, Erozan, Proakis, John G., and Salehi, Masoud, Reduced Complexity—Maximum Likelihood Sequence Esitmation for Multitrack High–Density Magnetic Recording Channels, IEEE Transactions on Magnetics , vol. 15, No. 4, Jul. 1999. pp. 2187–2192.

Richardson, Thomas J. & Urbanke, Rudiger L., The Capacity of Low–Density Parity–Check Codes Under Message–Passing Decoding, IEEE Transactions on Information Theory, vol. 47, No. 2, Feb. 2001.

Richardson Thomas, J., Shokrollahi, M Amin, and Urbanke, Rudiger L., Design of Capacity–Approaching Irregular Low–Density Parity–Check Codes, IEEE Transactions on Information Theory, vol. 47, No. 2, Feb. 2001, pp. 619–637.

Yeo, Engling, Pakzad, Payam, Nikolic, Borivoje, and Anantharam, Venkat, High Throughout Low–Density Parity–Check Decoder Architectures, IEEE 2001, pp. 3019–3024.

Yeo, Engling and Nikolic, Borivoje, VLSI Architectures for High–Speed Iterative Decoders, BWRC Winter Retreat, Jan. 2002.

Roh, Bong Gyun, Lee Sang, Uk. Moon, Jaekyun and Chen, Ying, Single–Head/Single–Track Detection in Interfering Tracks, IEEE Transactions on Magnetics, vol. 38, No. 4, Jul. 2002.

Chung, Sae–Young, Forney, G David Jr., Richardson, Thomas J. and Urbanke, Rudiger, On the Design of Low–Density Parity–Check Codes within 0.0045 dB of Shannon Limit.

Xie, Zhenhua, Rushforth, Craig K., Short, Robert T., Moon, Todd K., Joint Signal Detection and Parameter Estimation in Multiuser Communications,IEEE Transactions on Communication vol. 41, No. 7 Aug. 1993, pp. 1209–1216.

Poor, Vincent H. Turbo Multiuser Detection: An Overview, IEEE 6th Int. Symp on Spread–Spectrum Tech. & Application, NJ, Sep. 6–8, 2000, pp. 583–587.

Leonhardt, T. D., Van De Veerdonk, R. J. M., Van Der Heijden, P.A. A., Clinton, T. W., and Crawford, T. M., Comparison of Perpendicular and Longitudinal Magnetic Recording Using a Contact Write/Read Tester, IEEE Trans. Magn. vol. 37 pp. 1580–1582, Jul. 2001.

Roh, Bong Gyun et al., Single–Head/Single–Track Detection in Interfering Tracks, IEEE Transactions on Magnetics, vol. 38 No. 4, Jul. 2002, pp. 1830–1838.

Abbott, W. L., et al., Offtrack Interference and Equalization in Magnetic Recording., IEEE Transactions on Magnetics, vol. 24, No. 6, Nov. 1988, pp. 2964–2966.

Saliba, George,Laser Guided Magnetic Recording, Computer Technology Review, vol. XX, No. 7, Jul. 2000, West World Productions Inc.

Saliba, George, The Anatomy of Super DLTtape, Computer Technology Review, vol. XX, No. 8, Aug. 2000, West World Productions.

* cited by examiner

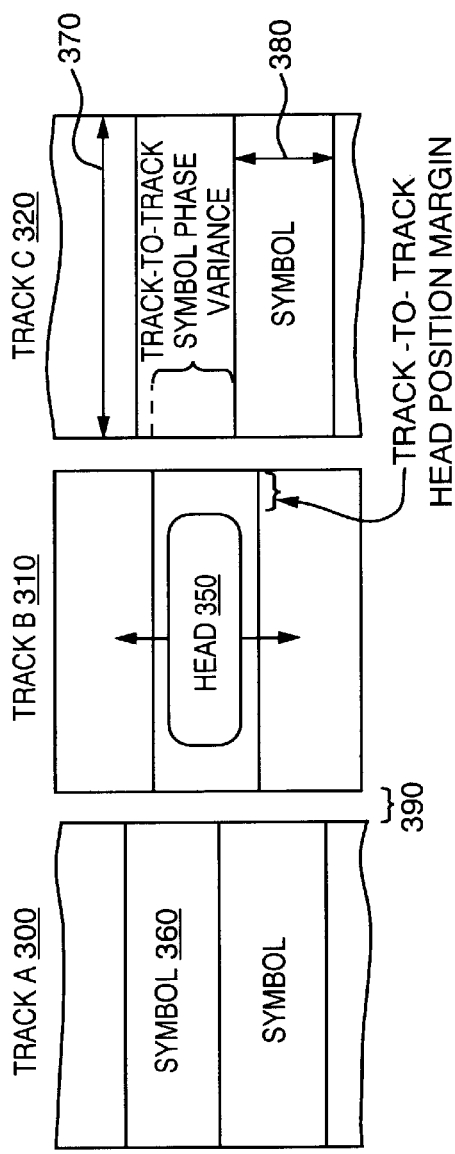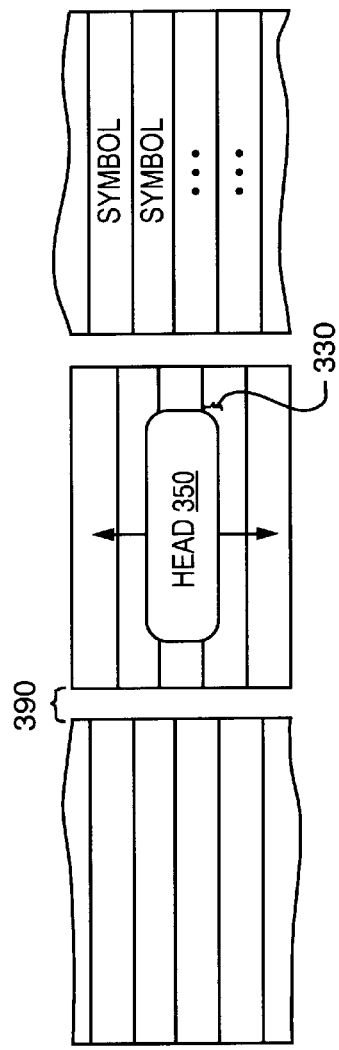
FIG. 4A (PRIOR ART)
FIG. 4B (PRIOR ART)

MULTICHANNEL DIGITAL RECORDING SYSTEM WITH MULTI-USER DETECTION

CROSS REFERENCE TO RELATED APPLICATIONS

This application claims priority as a Continuation-in-part under 35 U.S.C. Section 120 from a U.S. patent application Ser. No. 10/228,787 filed on Aug. 26, 2002, which is incorporated herein by reference for all purposes.

BACKGROUND OF THE INVENTION

1. Technical Field of the Invention

The present invention is a system for storage and retrieval of digital data. More particularly, the present invention involves processing digital recorded material with joint signal detection techniques.

2. Background Art

Digital data storage devices, such as computer drives and portable tapes, compact discs and floppy diskettes, are recording components in many electronic devices, and typically provide mechanisms for storing and retrieving large amounts of data quickly and reliably. Digital recorders, as used herein, refer to the many embodiments employed for storing digital information in a variety of digital systems and a multitude of applications. The most common form of digital recorder is a rotating radial magnetic disk. Other digital recorders include but are not limited to optical disks and magnetic tape systems, including linear devices.

The prior art disk drive system is well known in the art. A data storage disk, such as floppy disks, hard disks, and cubical disks as well as linear and multi-level disks all function in a similar fashion. The common radial disk contains a number of concentric data cylinders that contains several data sectors. The sectors are located on an upper side of the disk and additional sectors may be located on a lower side or in multiple layers within the disk. The disk is accessed by a head element mounted on an arm that is secured to the drive. The disk is accessed via photoemitters/photoreceptors for optical systems and with magnetic read/write elements as discussed herein for magnetic systems wherein various accompanying electronic circuits are familiar to those of skill in the art.

Using disk drives as an example, the disk is typically subdivided into one or more partitions by using a partition table that is located on the disk. A wide variety of partitions file systems as discussed in the prior art are not necessary for a proper understanding of the present invention. A given sector on the disk is usually identified by specifying a head, a cylinder, and a sector within the cylinder. A triplet specifying the head number, cylinder number, and sector number in this manner is known as a physical sector address. Alternatively, a given sector may be identified by a logical sector address, which is a single number rather than a triplet of numbers.

In more specific detail, for a data storage device, such as a magnetic disc drive, the recording medium is typically divided into a plurality of generally parallel data tracks. The data is stored and retrieved by a transducer or head element that is positioned over a desired data track by an actuator arm. The head element can be a combined read/write head or separated into a read head and a write head in close proximity.

The actuator arm typically moves the head across the data tracks under the control of a closed-loop servo system based on servo data stored on the disc surface within dedicated servo fields. The servo fields can be interleaved with data sectors on the disc surface or on a separate disc surface that is dedicated to storing servo information. As the head passes over the servo fields, it generates a readback servo signal that identifies the location of the head relative to the centerline of the desired track. Based on this location, the servo system rotates the actuator arm to adjust the head's position so that it moves to the desired position.

There are several prior art types of servo field patterns, such as a null-type servo pattern, a split-burst amplitude servo pattern, and a phase type servo pattern. A null type servo pattern includes at least two fields which are written at a known phase relation to one another. The first field is a phase or sync field which is used to lock the phase and frequency of the read channel to the phase and frequency of the read signal. The second field is a position error field that is used to identify the location of the head with respect to the track centerline.

In a typical prior art embodiment, as the head passes over the position error field, the amplitude and phase of the read signal indicates the magnitude and direction of the head offset with respect to the track centerline. The position error field has a null-type magnetization pattern such that when the head is directly straddling the track centerline, the amplitude of the readback signal is ideally zero. As the head moves away from the desired track centerline, the amplitude of the read signal increases. When the head is half-way between the desired track centerline and the centerline of the adjacent track, the read signal has a maximum amplitude. The magnetization pattern on one side of the centerline is written 180 degrees out of phase with the magnetization pattern on the other side of the centerline, and the phase of the read signal indicates the direction of the head position error.

To control the servo system, a single position error value is normally generated for each pass over the position error field. Typically, the magnitude of the position error value indicates the distance of the head from the track centerline, and the sign of the position error value indicates the direction of the head's displacement. The position error values are typically created by demodulating the read signal associated with the position error field. In a synchronous process, the exact phase of the read signal from the position error field is known from the phase field's read signal because the phase field is written on the storage medium at a known and fixed phase relation to the position error field. A phase-locked loop (PLL) is typically used to acquire the phase of the phase field, and this phase information is used for demodulating the position error field.

Processing of the read signal is generally demodulated by generating a demodulating signal, such as a square wave, having the same phase and frequency as a fundamental component of the read signal and then, with analog techniques, multiplying the read signal by the demodulating signal. The product is integrated over a time window that corresponds to the middle cycles of the position error field. The result is a position error value for the head with respect to a desired position on the storage medium within that servo pattern. This process essentially identifies the amplitude and phase of the read signal at a specific frequency point. The sign of the position error value indicates which direction the head is located with respect to the desired location.

The most common application for digital recorders is the computer disk drive. All sizes of computers including portable laptops, personal computers and mainframes include a digital recording system. Typically the recording device is a magnetic disk drive, but other devices such as optical disks and tape systems are also commonly used. Besides computers, other digital systems also use digital recorders, for example, digital video cameras write data to a digital recorder in the form magnetic tape, magnetic hard disks or optical disks.

Magnetic disc drives, because of their greater speeds, have become the medium of choice for storing frequently accessed data such as application programs and user data which is being created or frequently modified. Conventional magnetic disk drive storage systems have been commonly used and are well known in the art. These storage systems typically use a flying magnetic read/write head, either combined or separate read head and write head, to record and retrieve data from a layer of magnetic recording material on the surface of a rotating recording disk. The capacity of such a storage system is a function of the number of closely spaced concentric tracks on the recording disk that may be reliably accessed by the read/write head. Some parts of the recording disk surface area may be used for purposes other than data storage.

For example, means for assuring the proper selection of a particular track by the read/write head are required for reliable data storage and retrieval. The read/write head is typically aligned and kept centered over a particular track as the recording disk rotates, to prevent accidental over-writing of data stored in neighboring tracks and to minimize inter-track interference. Some systems use nonmagnetic guard rings between discrete tracks on the recording disk to help keep the head from skipping off-track. Gain control references may be placed at different locations on the recording disk to calibrate the electronic amplifiers used to reliably read back data signals. Time delay elements are also sometimes used to allow the magnetic read/write head to demagnetize after recording data to prevent unintentional over-writing of subsequently accessed locations. The prior art designs take up some of the available recording disk surface area, and thus reduce overall system capacity.

In a magnetic hard disk drive, data bits are stored as transitions between ferromagnetic domains, the absence of transitions, or some combination thereof, indicating a one and a zero respectively. When the read/write head floats over the spinning drive, the transition shows up as a pulsed waveform while the absence of a transition shows up as a flat waveform. By synchronizing and detecting pulses, the read head decodes the ones and zeros on the disk. Each symbol on a track is a 'bit' and generally takes the form of a Lorentzian pulse. Magnetic media tends to be two state storage devices due to the physics.

The 'bits' as referenced herein refer to any of the schemes that allow for a '1' and a '0' to be detectable by the read element and subsequent processing. For example, the data bits interpreted as '1's and '0's may be a magnetic transitions such as polarized and not polarized; polarized and reversed polarized; a transition between two states; or absence of transitions. It is presumed that there will continue to be improvements into the manner in which bits can be written and read, all of which are within the scope of the invention.

Signal processing is used to some extent to optimize the storage on the in-track direction. However, no similar technique currently applies to adjacent track interference, which is known to severely limit disk drive performance. There have been attempts to increase the density of disks in order to have more narrow magnetic domains in the cross-track direction. While the write technology has advanced to allow denser writing, the read technology has been limiting factor in data density.

The importance and significance of signal processing is detailed in the article from IEEE Signal Processing Magazine, July 1998, entitled "The Role of SP in Data-Storage" by Jackyun Moon. The problems related to intersymbol interference (ISI) are described along with the prior art processing techniques involving sequence detectors and symbol-by-symbol detectors. The symbol detectors are more likely to be effected by ISI, whereas the sequence detectors make symbol decision based on the observation of signals over many symbol intervals. Examples of sequence detectors include maximum-likelihood sequence detectors (MLSD), finite or fixed delay tree search detectors (FTDS) and partial-response maximum likelihood (PRML) techniques.

However, the prior art is replete with the attempts and problems with decreasing the spacing in order to put more digital information in a smaller space on the recording medium. While the write elements are technically capable of writing in a smaller area, the read element has limitations that restrict the size of the storage cells and the spacing. An example reference would be Roh, Lee and Moon, "Single-Head/Single-Track Detection in Interfering Tracks", IEEE Transactions on Magnetics vol 38 page 1830 from July 2002. This reference and many others discuss how interference from adjacent tracks due to head misalignment or other effects that tend to become the dominant source of read errors.

There has been considerable research in gigabit-density recording, including an article by Tsang, Chen and Yogi, which discusses the "Gigabit research in Gigabit-Density Magnetic Recording", Proceedings of the IEEE, Vol. 81, No. 9, September 1993. This article illustrates the need for advanced processing that can take advantage of the high density disk recording of the data recorded as transitions that relate to the abrupt Magnetization changes on the tracks of the disk.

There are a variety of factors that limit the read/write capabilities of storage media, including various types of noise, inter-track interference, intersymbol interference, and non-linear distortion. Numerous equalization and coding schemes have evolved to provide more accurate determinations and permit greater density storage. One type of noise source for magnetic disk storage is the result of the recording head positioning error. This off-track or inter-track interference (ITI) can be modeled and reduce the associated errors. There are types of noise that are random, such as transition noise that occurs due to random variations in the geometry of magnetic transitions. There are also types of nonlinearities that have a repeatable characteristic and these distortions can be modeled and eliminated. One manner for describing the nonlinear distortions uses Volterra functional series which constructs the nonlinear portion of the signal as the sun of the outputs of nonlinear kernels. Also, the read head is sensitive to magnetic domains and adjacent tracks, and even if perfectly aligned, tracks must be spaced far enough apart to allow distinctions for processing. One reference for this noise model would be T. Oenning and J. Moon, "Modeling the Lorentzian Magnetic Recording Channel with Transition Noise" from IEEE Transactions on Magnetics volume 37 page 583 (January 2001).

Magnetic recording devices, such as magnetic disks and tapes, use heads to read and write information to and from a magnetic surface. In a typical rotating storage system, data is stored on magnetic disks in a series of concentric tracks. These tracks are accessed by a read/write head that detects variations in the magnetic orientation of the disk surface. In most embodiments the read/write head moves back and forth radially on the disk under control of a head-positioning servo mechanism so that it can be selectively positioned over a specific track. Once the head is aligned over a track, the servo mechanism causes the head to trace a path that follows the center line of the selected track. Tracks as discussed herein refer to any segments parallel to relative motion of the sensor.

The recording head induces a magnetic field with sufficient amplitude to record on the magnetic material of the storage device to a sufficient depth. The magnitude and direction of the magnetic flux is modulated to encode information into the magnetic surface of the storage device. A pattern of external and internal fields are created as the head and recording surface are moved relative to each other. The polarity transitions are then readable as transitions in the magnetic flux at the recording surface. In read mode, as the magnetic storage surface moves across the gap in the head, the magnetic field of the storage surface is detected, and a voltage is induced in the head proportional to the rate of change of the flux. The read channel then processes the analog voltage signal to obtain the digital data.

Various types of indexing marks and alignment indicia are also recorded on the recording disk surface for precise position reference and tracking adjustment of the read/write head. These marks and indicia are often recorded in servo sectors, which are angularly-spaced reserved portions of the recording disk surface that extend out approximately radially from the recording disk centers. Track addresses are sometimes recorded in servo sectors. Angular synchronization signals that determine the circumferential location of the magnetic head may also be recorded in servo sectors. Normal and quadrature servo blocks are often recorded in servo sectors for generation of position error signals that are used to keep the read/write head aligned. Servo sectors use recording disk surface area that could otherwise be used for data storage, however, so servo sector information should be stored as efficiently as possible.

A typical prior art read process commences as the analog read signal originates from the read head which is then amplified in the preamplifier and then provided to a filter for the removal of high-frequency noise components. The filtered signal is then provided to a phase-locked loop clock circuit and delay line. The delay line provides the delayed signal for the analog-to-digital converter (ADC) where the signal is digitized. The digitized signal is passed through an equalizer to obtain a more desirable waveform, and the result is provided to a decoder. The decoder implements a decoding algorithm to generate the digital data signal. The analog-to-digital converter and decoder are clocked by a clock signal generated in a phase-locked loop clock circuit.

With respect to in-track processing, it was recognized early on that the single symbol bit processing was not satisfactory in dealing with ISI and noisy signals, and partial response maximum likelihood (PRML) processing provided certain benefits. In the PRML channel characterized by the polynomial (1−D)(1+D), a notch filter is generally used because the frequency response requires a sharp cutoff and the frequency spectrum is very different from that of the channel response in magnetic recording. A variation of PRML is extended partial response maximum likelihood (EPRML) that obviates the need for the notch filter. However, the Viterbi type computations for maximum likelihood detection become a limiting factor in terms of decoding speed and cost. Furthermore, both PRML and EPRML channels are very sensitive to mis-equalization or changes in signal shape due, for example, to component tolerances and to nonlinearities of the magnetic recording process such as caused by pulse asymmetry and the crowding of write transitions on the media. Moreover, the problems associated with cross-track interference still remain.

Early magnetic storage devices used analog peak detection to process incoming read signals. However, as recording density increased, the analog peak detection scheme became unreliable because of the large amount of inter-symbol interference (ISI) between adjacent pulses. The partial response maximum likelihood (PRML) channel has been used to increase the recording density, but the PRML method requires equalization of the read signal, and the code scheme is incompatible with the run-length limited (RLL) code. In addition, the required number of magnetic flux transitions per inch is much higher. Therefore, the magnetic non-linearity problem is more severe for the PRML system, and could even render it unusable at high recording densities.

Run-length limited (RLL) codes are used to place an upper bound on the number of data clock cycles occurring between signal transitions, and the clock recovery is based on the occurrence of these transitions. RLL codes ensure that sufficient transitions occur for the clock recovery circuit to maintain the correct timing phase and frequency. In an NRZI format, each 1 is represented by a transition, and each 0 is represented by the lack of a transition, and the RLL code is sufficient for clock recovery purposes. Also, by maintaining the minimum of one 0 between consecutive 1's, transitions are separated so as to be differentiable from one another.

A signal processing method that uses RLL codes to improve the detection margin at high recording densities is described in U.S. Pat. No. 4,945,538. In U.S. Pat. No. 4,945,538, sample values of an analog signal corresponding to binary data are coded with a RLL code. The coded analog input signal is converted to a sequence of digital sample values and the signal is equalized to correspond to a predetermined analog shape. A sequence detection algorithm is used to decode the digital sample values into the coded binary data.

A different approach to increase the capacity and speed of optical data-storage systems uses multilevel optical recording systems. The term multilevel refers to more than two levels of data recorded on the medium. The density of data recorded on an optical recording medium is increased by modulating the reflectivity of the optical recording medium into more than two states. However, at high data densities, light reflected from one mark will tend to interfere with light reflected from adjacent marks, causing intersymbol interference (ISI). The effect of the ISI is greater when the marks are closer together.

Optical data disc readers primarily have involved analog filtering of the read signal to equalize the frequency response of the system in order to predict how much contrast an optical imaging system will generate when scanning different spatial frequencies. Digital equalization is generally superior to analog equalization, as discussed in U.S. Pat. No. 5,818,806. And, a method for providing digital equalization filters for multilevel data-storage systems and a compensating scheme for intersymbol interference is described in U.S. Pat. No. 6,377,529.

Phase-change technology has been around since 1995, and the PD drive combines an optical disk drive capable of handling high capacity disks along with a multi-speed CD-ROM drive. It uses purely optical technology, and relies on the use of a laser to write new data with just a single pass of the read/write head. In the PD system, the active layer is made of a material with reversible properties, and a high-power laser heats the portion of the active layer where data is to be recorded. The heated area cools rapidly, forming an amorphous spot of low reflectivity. A low-powered laser beam detects the difference between these spots and the more reflective, untouched, crystalline areas, thus identifying a binary "0" or "1". By reheating a spot, recrystallisation occurs, resulting in a return to its original highly reflective state. Laser temperature alone changes the active layer to crystalline or amorphous according to the data required, in a single pass.

Compact discs (CD's) are examples of digitally recorded data, and typically ascribe to the ISO 9660 standard. CD's originated from audio applications, so the amount of information a CD can hold is measured in minutes:seconds:sectors. Each second contains 75 sectors, each of which can hold 2048 bytes (2 kilobytes) of Mode 1 user data. Recordable CD's presently are available in a variety of sizes, namely 21- (80 mm diameter), 63-, and 74-minute sizes (both 120 mm diameter), which can contain the following amounts of data in the CD-ROM format:

21 min×(60 sec)×(75 sectors)×(2 kbytes)=189,000 kilobytes=184 megabytes 63 min×(60 sec)×(75 sectors)×(2 kbytes)=567,000 kilobytes=553 megabytes 74 min×(60 sec)×(75 sectors)×(2 kbytes)=660,000 kilobytes=650 megabytes Factory-recorded CD's generally hold 74 minutes of audio or 650 MB of data. There are several overhead fields that must be deducted when calculating the total amount of data that you can fit on a CD: Session Lead-In and Lead-Out. The first lead-in and lead-out on a disc are not usually taken into consideration when calculating space available on disc, and they are considered to be outside the usable disc area.

Files on CD do not occupy a space exactly equal to their original size, because the minimum recordable unit on a compact disc is the logical block. Logical block size depends upon the size of the drive and is calculated by an intrinsic formula. The larger the drive, the larger the logical block size, hence the more space a given file will consume.

The more portable recording mediums such as the traditional floppy disks are slowly relenting to other mediums with greater capacity. With state of the art hard disks measured in gigabytes, and with multimedia and graphics file sizes often measured in tens of megabytes, a capacity of 100 MB to 150 MB is required whether moving a few files between systems, archiving or backing up individual files or directories, and sending files by electronic mail.

Magnetic tape data storage devices, also referred to as tape drives, have been used in the computer industry for years for the storage of large amounts of data. Tape drives have achieved preeminence as storage devices for portable storage and long-term and data backup purposes.

With respect to portable storage, devices such as Iomega's Zip drive provide use a technology developed by Iomega that draws the flexible disk upward towards the read/write head rather than moving the head toward the medium. Another portable scheme is LS-120, later termed SuperDisk, which resembles 1.44 MB 3.5 in disk, but uses a refinement of the floptical technology to deliver much greater capacity and speed. Named after the LS-120 laser servo technology it employs, an LS-120 disk has optical reference tracks on its surface that are both written and read by a laser system. These servo tracks are much narrower and can be laid closer together on the disk, wherein an LS-120 disk has a track density of 2,490 tracks per inch (tpi) compared with 135 tpi on a standard 1.44 MB floppy. Another option for portable storage is Sony's HiFD drive, having a capacity of over 200 MB per disk. Compatibility with conventional 1.44 MB floppy disks is provided by equipping the HiFD with a dual-head mechanism. When reading 1.44 MB floppy disks, a conventional floppy-disk head is used and comes into direct contact with the media surface. The separate HiFD head works more like a hard disk, gliding over the surface of the disk without touching it.

With respect to hard drives, most hard drives are multi-GB, whether removeable or fixed. For removable drives, there are various options including the Iomega Jaz drive, SyQuest's 1.5 GB SyJet and 1 GB SparQ. While generally similar to a hard disk the Jaz drive for example employs twin platters that sit in a cartridge protected by a dust-proof shutter which springs open on insertion to provide access to read/write heads. The Castlewood ORB was the first universal storage system to be built using magnetoresistive (MR) head technology, making them very different from other removable media drives that use older hard drive technology based on thin film inductive heads. MR hard drive technology permits a much larger concentration of data on the storage medium.

Optical storage using the blue laser is of considerable interest because the smaller wavelength of the drive's laser light limits the size of the pit that can be read from the disc, thus having a narrow beam that can read smaller dots. The DVD Forum's Steering Committee are promoting a proposed format—dubbed "Blu-ray Disc"—that is capable of providing storage capacities of up to 27 GB and 50 GB on single-layer and dual-layer discs respectively. The driving force behind such huge capacities is the emergence of multimedia applications in relation to both high-quality digital video and audio into the PC mainstream, coupled with the emergence of high-definition TV (HDTV), which is debuting in terrestrial broadcast systems.

Regardless of the technology underlying the portable disks, DVD's, CD's or tapes, or fixed/removable hard drives, including magneto optical, and rotating magnetic media the overall trend is to write/read in a compact format and optimize the space required with a stable and robust system.

Newer magneto-optical technology offers many improvements over conventional magnetic technology, particularly in terms of increased capacity. Magneto-optical storage systems also record data onto a recording material coated onto the surfaces of one or more rotating recording disks, but via different means than conventional drives. The recording material undergoes a sharp increase in magnetic susceptibility when heated beyond its Curie point, the temperature at which the magnetic properties of the recording material change from ferromagnetic to paramagnetic. A localized magnetic domain is created by heating a region of the recording material and then applying a magnetic field of a desired orientation to the heated region. When the recording material cools, the localized magnetic domain retains its magnetic orientation and again becomes far less susceptible to applied magnetic fields.

An optical fiber may guide an intense beam of focused laser light to heat a localized magnetic domain to be recorded or overwritten. The data stored in a particular localized magnetic domain may also be read back nondestructively by such a combined laser and optical fiber system. A low-powered, linearly polarized laser beam focused on a particular localized magnetic domain will be reflected with a Kerr rotation of the angle of polarization determined by the magnetic orientation of the localized magnetic domain. The pattern of polarization rotations read back as the low-powered laser beam moves across the recording surface thus represents the pattern of magnetic orientations previously written onto the recording surface. The overall reflectivity of a localized magnetic domain may also be determined via measurement of the relative amplitude of the reflected laser beam.

Magneto-optical storage systems quickly and reliably locate and align to any particular storage location on the recording disk, as with existing storage systems. A scheme for accomplishing these goals that takes advantage of the unique properties of a magneto-optical storage system is needed. An efficient system for encoding servo sector information is therefore important for maximizing the amount of remaining disk surface area available for data storage and retrieval.

The technology of tape drives has evolved from large, expensive open reel machines to the current generations of cassette tape drives, which store large amounts of data in convenient self-contained cassettes. Historically, open reel tape drives recorded data on parallel data tracks which extend along the length of the tape, and utilized fixed data recording/retrieval heads, i.e., one dedicated read/write head for each data track.

The actual recording and recovery of data on the tape medium is accomplished by a gap in the read/write head, and is in the form of magnetic flux reversals formed in the magnetic coating on the tape. To maximize the sharpness of the flux reversals and increase the amplitude of the read data pulses induced in the head during subsequent read operation, the length of the head gaps is aligned as precisely as possible with the direction of tape motion past the heads.

Historically, in order to ensure the integrity of data written on the tape, the tape drives included multi-gap heads, with one gap employed to write data and another gap, immediately trailing the write gap along the direction of tape motion, used as a read gap which could perform a read/verify operation on the data just recorded. If the tape drive was intended to record/recover data with the tape moving in both directions, an additional write or read gap was needed.

Several cassette-type tape drive formats are industry standards, including the format referred to as the QIC, or quarter inch cassette. In QIC format tape drives, data is recorded on a plurality of data tracks which extend parallel with the length of the tape as was typical in open reel type tape drives, but employ only a single recording/playback head which is controllably movable to each of the data tracks. A commonly used mechanism for controlling the movement of the head from track to track employs a worm gear driven by a stepper motor, with the pitch of the worm gear and the radial precision of the stepper motor determining the accuracy of head movement, including the repeatability of multiple head movements to any one given track.

One of the major factors controlling the overall storage capacity of tape storage devices is referred to as track density, typically defined in data tracks per inch of tape width, or how closely the data tracks are spaced. The greater the track density, the greater number of tracks that can be recorded on a given width of tape and the greater the overall cassette data capacity. A known factor limiting track density is referred to as adjacent track interference, which is the corruption or loss of data brought about when data on a given track is written at a location touching or even overlapping the previously recorded data on an adjacent data track. In such a situation, the amplitude of the readback signal can be reduced, and there is a limit to the amount of readback signal reduction which can be tolerated and beyond which data can be corrupted or lost completely.

Another factor controlling the ability of the tape drive to recover previously recorded data is a characteristic of the tape drive referred to as head azimuth, or simply azimuth, which is a measurement of the alignment between the longitudinal direction of the data tracks and the gap of the read/write head.

In the specifications defining the QIC tape drive and tape cassettes, one of the major planar surfaces of the cassette, called the cassette base plate, contains features which define a datum referred to as the tape cassette -B- plane. The tape cassette -B- plane is used, in conjunction with mating features on the tape drive which comprise a tape drive -B- plane, to define a mating surface between the tape cassette and the tape drive, and thus a base datum for defining the locations of both tape cassette and tape drive components and features along an axis normal to the common -B- plane. Because the data tracks extend along the length of the tape, the length of the head gap which accomplishes the recording and retrieval of data on the data tracks is nominally parallel with the length of the data track and thus also nominally parallel to the -B- plane. It is known, however, that small deviations from this nominally parallel relationship are introduced by component and manufacturing tolerances. It is this geometric relationship between the length of the head gap and the -B- plane which is referred to as azimuth. When the length of the head gap is parallel to the -B- plane, or, in other words, when the width of the gap is perpendicular to the -B- plane, azimuth is considered to be zero, with deviations from parallel in a first direction being referred to as positive azimuth and deviations in the opposite direction being referred to as negative azimuth. Non-zero azimuths are typically measured in units of rotation, such as minutes.

Tape drives used for recording video images have made use of this knowledge for several years to reduce intertrack interference and maximize the amount of storage on a given area of tape surface.

U.S. Pat. Nos. 5,307,217 and 5,371,638, for instance, (hereinafter the '217 and '638 patents, respectively) disclose apparatus and methods directed to recording data at opposite azimuth angles on adjacent data tracks in order to minimize intertrack interference, and thus maximize data capacity on tape media. There are, however, several differences in both the type of tape drive in which the disclosed method and apparatus are employed and in the specific apparatus which implements the recording of data at opposite azimuth on adjacent data tracks.

Thus, there is a growing demand for increased storage capacity and increased speed. What is needed therefore, is a method and apparatus that allows for more efficient storage and retrieval of digital data. More particularly, such an invention should allow digital recording with joint signal detection techniques for devices where efficient use of a storage medium is desirable in terms of optimizing device size, access speed and power consumption. Applications can include disk drives, tape systems, storage implementations for digital cameras, PDA's, and any related devices employing digital storage media regardless of whether the technology is magnetic, optical or future storage technology.

SUMMARY OF THE INVENTION

The invention is devised in the light of the problems of the prior art described herein. Accordingly it is a general object of the present invention to provide a novel and useful digital recording implementation that uses multi-user detection techniques that can solve the problems described herein. The digital recording devices of the present invention include, but are not limited to various forms of tapes, disks, disc drives and virtually any device that has recorded data on a medium that is extracted by a sensing element.

Accordingly, it is an object of the present invention to provide a digital recording system consisting of a storage medium, a data writing element, a data reading element capable of reading closely spaced interfering bits written on the storage medium, a read signal processing element and appropriate servo mechanisms and controllers for engaging the read and write elements with the storage medium. Joint signal detection is known to separate interfering digital signals in the same channel, provided that the interfering signals have sufficient power relative to the noise floor in the channel. The present invention applies this technique to mitigate adjacent track interference by simultaneously demodulating signals arising from multiple closely spaced tracks underneath the reading element. It has been contemplated and within the scope of the invention to include read-only devices that would eliminate the writing elements and simplify the invention.

Another object of the present invention is to provide digital recorders that can recover data from media packed so densely that adjacent bits written to the medium interfere when accessed by the read mechanism.

Yet another object of the present invention is to provide digital recorders that can simultaneously demodulate multiple digital bits with a single read sensor.

A further object of the present invention to provide data storage scheme that provide parallel access to related parts of data files stored on the recorder to increase bandwidth.

A still further object of the present invention is to provide digital recorders with higher data storage density than recorders with single channel read sensors.

Another object of the invention is to provide digital recorders with faster data access to large files stored in the medium by exploiting parallel demodulation capability of the joint detection read sensor. Another problem with digital storage access is the rate at which data can be read from the storage medium. In applications where large files must be read, such as images and video, it is desirable to increase the access rate. The ability to simultaneously demodulate multiple tracks would in conjunction with a buffering mechanism, enable faster data transfer from the disk. A further object accomplished by the present system is that with the closer and denser tracks, there is an improved and faster track-to-track seek time.

Another object of the invention is to provide a means for reducing the power consumed by digital recorders by using the parallel demodulation capability of the joint detection read sensor. This implementation also reduces the mechanical speed of the storage medium and further reduces the digital clock frequency of the symbol sampling and synchronization circuits along with all other signal conditioning circuits commonly used in read sensor signal processing.

The present invention provides a digital recorder capable of storing digital data on a medium, a data writing mechanism capable of writing the data bits sufficiently close together on the medium to create adjacent symbol interference when read by the data access sensor, a data sensor capable of sensing the composite signal received by the interfering signals, a read sensor signal processing element capable of simultaneously demodulating and recovering the interfering signals, servo mechanisms for moving the read and write sensors over the storage medium and a system control mechanism for scheduling the motion of the read and write sensors and communicating data to and from the digital recorder. In most applications, it is desirable to minimize the power consumed by the digital recorder. Using the read mechanism of the present invention allows the disk to spin at a slower speed with slower clocking on the digital electronics used to process the signals read from the storage element.

Similar issues can be addressed in discussing optical disk systems. Intersymbol spacing must be sufficient to prevent intersymbol interference in the read sensing mechanism. Providing a read sensing mechanism able to simultaneously recover interfering optical signals would provide the benefits discussed above for magnetic disk drives in terms of greater data density on the storage medium, faster access time and reduced device power consumption.

And the same issues apply to magnetic tape systems. The spacing of adjacent tracks on the tape is also limited by intertrack interference. Providing the read sensor with means to separate closely spaced interfering signals also would provide the benefits discussed above for magnetic disk drives in terms of greater data density on the storage medium, faster access time and reduced device power consumption.

A further object is a method and apparatus for minimizing or eliminating adjacent track interference, thus leading to increased data reliability, increased track density and increased overall data capacity in tape drives. In one embodiment additional information is placed in the guard area so the guard area can be used for data that is more easily distinguished from the tracks. The guard area is defined as blank space between tracks that is ordinarily used to separate signals to prevent adjacent track interference.

In one embodiment the present invention utilizes diversity enhanced MUD by making at least one pass with one head and using the data from the multiple passes to provide better accuracy. Alternatively, there can be one pass with two heads to accomplish the same accuracy which in essence uses data from different spatial orientations.

One object of the invention is a system for reading data from a storage medium, comprising a storage surface on the storage medium having encoded data bits defined by in-track spacing and cross-track spacing, wherein the encoded data bits are stored in a plurality of data tracks. There is a means for positioning a read element over the storage surface, wherein the read element simultaneously detects the encoded data bits from several adjacent tracks. There is also a means for conditioning the encoded data bits from the read element and a means for demodulating the encoded data bits from the adjacent tracks.

An object of the invention includes an apparatus for reading data bits from a storage medium using multi-user detection, comprising a plurality of tracks wherein the data bits reside within a plurality of storage cells on the tracks. There is at least one read element simultaneously detecting a plurality of the tracks and converting the data bits into a plurality of electrical signals. A front end unit is used for processing the electrical signals and converting the electrical signals into a plurality of digital bits. A parameter estimator is coupled to the front end unit for identifying a track transfer function for the plurality of tracks. Finally, a multi-user detector is coupled to the parameter estimator and the front end unit for separating the tracks and reading the data bits.

Another object includes the storage medium selected from the group comprising floppy disks, hard disks, cubical disks, linear disks, multi-level disks, liner tapes, radial disks, compact disks, digital video disks, magneto optical disks, and rotating magnetic media. In addition, a storage medium, wherein the data bits are stored on the storage medium by a storage technology selected from the group comprising magnetic, optical, magneto optical, electrostatic, and quantum.

An additional object is the apparatus for reading data bits from a storage medium wherein the track transfer function includes envelope information of a shape, amplitude and phase of each of the plurality of data tracks. Furthermore, wherein the digital bits are represented by a Lorentzian pulse shape.

Yet another object is the apparatus for reading data bits, further comprising a guard-track spacing providing a separation between adjacent tracks. Alternatively, the plurality of data tracks can be proximate each other without a guard-track spacing. In addition, the data tracks can be multi-layered.

A further object is the apparatus for reading data bits, wherein the front end unit comprises a preamplifier, a low pass filter and an analog-to-digital converter. The apparatus can further comprise a temporary storage buffer coupled to the multi-user detector and an output multiplexor for parallel processing. A further addition is a filter unit coupled to the multi-user detector, wherein the filter unit can be a whitening matched filter bank or a matched filter bank. There can also be a sector cache coupled to the multi-user detector for buffering the data.

Another object includes the apparatus for reading data bits, wherein the multi-user detector is selected from the group comprising a maximum likelihood MUD, TurboMUD, and linear algebra based multi-user detector. The multi-user detector can also employ an algorithm selected from the group comprising an M-algorithm, T-algorithm, or MT-algorithm, based upon MAP, Log-MAP, or Max-Log MAP detectors. The apparatus for reading data bits also includes wherein the symbols use codings selected from the group comprising quadrature phase shift keying (QPSK), binary phase shift keying (BPSK), Code Division Multiple Access (CDMA), quadrature amplitude modulation (QAM), Frequency Division Multiple Access (FDMA), Time Division Multiple Access (TDMA) amplitude modulation (AM).

An object of the invention is a method for processing data bits of a storage medium, comprising the steps of reading a plurality of analog signals corresponding to the data bits from several adjacent tracks of the storage medium, digitizing the analog signals into digital data, generating a track transfer function of the digital data, and demodulating the digital data. An added object is the method for processing receiver signals, further comprising the step of reading at least once.

An object of the invention is an apparatus for reading and writing digital data, comprising, a storage medium wherein the digital data is represented by a plurality of storage cells on a plurality of tracks, each of the storage cells having an in-track spacing and a cross-track spacing, and each track separated by a guard-track spacing. There is a read sensor oriented to capture at least one storage cell from at least one track, with a write element oriented to write to a storage cell. A servo system is coupled to the read element, the write element and the storage medium with a system controller coupled to the servo system. A signal conditioner is coupled to the read element, wherein the signal conditioner comprises a front end unit, a parameter estimator, and a joint detector for processing the data bits from the plurality of tracks.

Further objects include the apparatus for reading and writing digital data, wherein the read element is stationary and the storage medium is moveable; the read element is moveable and the storage medium is stationary; and the read element is moveable and the storage medium is moveable.

In summary, the present invention technique applies to any storage medium where the sensor is close to a storage medium and that there is relative motion defining in-track and cross-track interference. The sensing element picks up information signals and interference and provides information processing of dense storage devices and mitigates cross-track interference. Several related applications by the common assignee are incorporated by reference herein related to parameter estimation and MUD processing.

Still other objects and advantages of the present invention will become readily apparent to those skilled in this art from the following detailed description, wherein we have shown and described only a preferred embodiment of the invention, simply by way of illustration of the best mode contemplated by us on carrying out our invention. As will be realized, the invention is capable of other and different embodiments, and its several details are capable of modifications in various obvious respects, all without departing from the invention.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF THE PREFERRED EMBODIMENT

The methods and embodiments of the multichannel digital recorder disclosed herein enable implementations of storage and retrieval of digital data with an increased capacity. The preferred embodiments are merely illustrations of the techniques. There are many other variations and applications all within the scope of the invention.

Figure 1:
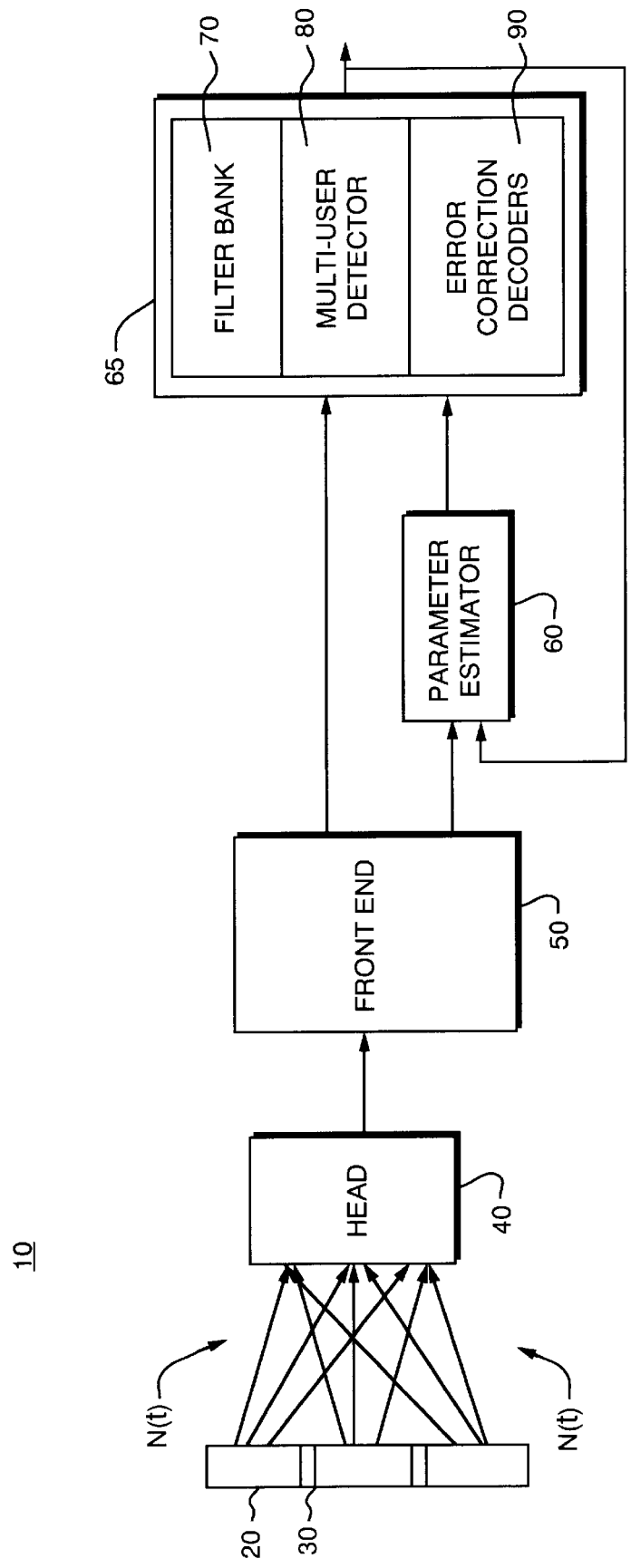
FIG. 1 shows a top view block diagram presentation of the multi-user detection for a recording medium

Referring to FIG. 1, one embodiment of the present invention is depicted in block diagram presentation. The multi-user reading device 10 shows a section of a disk having several tracks 20 separated by guard-track spacing 30. A read element 40 simultaneously extracts a plurality of signals from the tracks 30 along with additive sensor noise (N(t)) and cross-track and in-track interfering signals. The signals from the read element are analog signals with a voltage proportional to the received input for a given signal and a phase component.

The signals are processed by a front end unit 50 that typically comprises a pre-amplifier to boost the signals and a filter to remove certain noise values. An analog-to-digital (A/D) converter digitizes the analog values into a digital stream or raw data. The digitized signals are processed by a parameter estimator 60 and are also processed by a MUD processing section 65. The MUD processing section encompasses a preprocessing section that is typically a bank of matched filters 70. The multi-user detector 80 uses an algorithm to establish estimates for the most probable digital bits and a bank of decoders 90 provides further processing. The data generally loops within the MUD section until a fixed number of iterations is satisfied or a certain level of accuracy is achieved. There are various modes of MUD processing known in the art, however the implementation in a disk drive scenario has heretofore not been accomplished.

Figure 2:
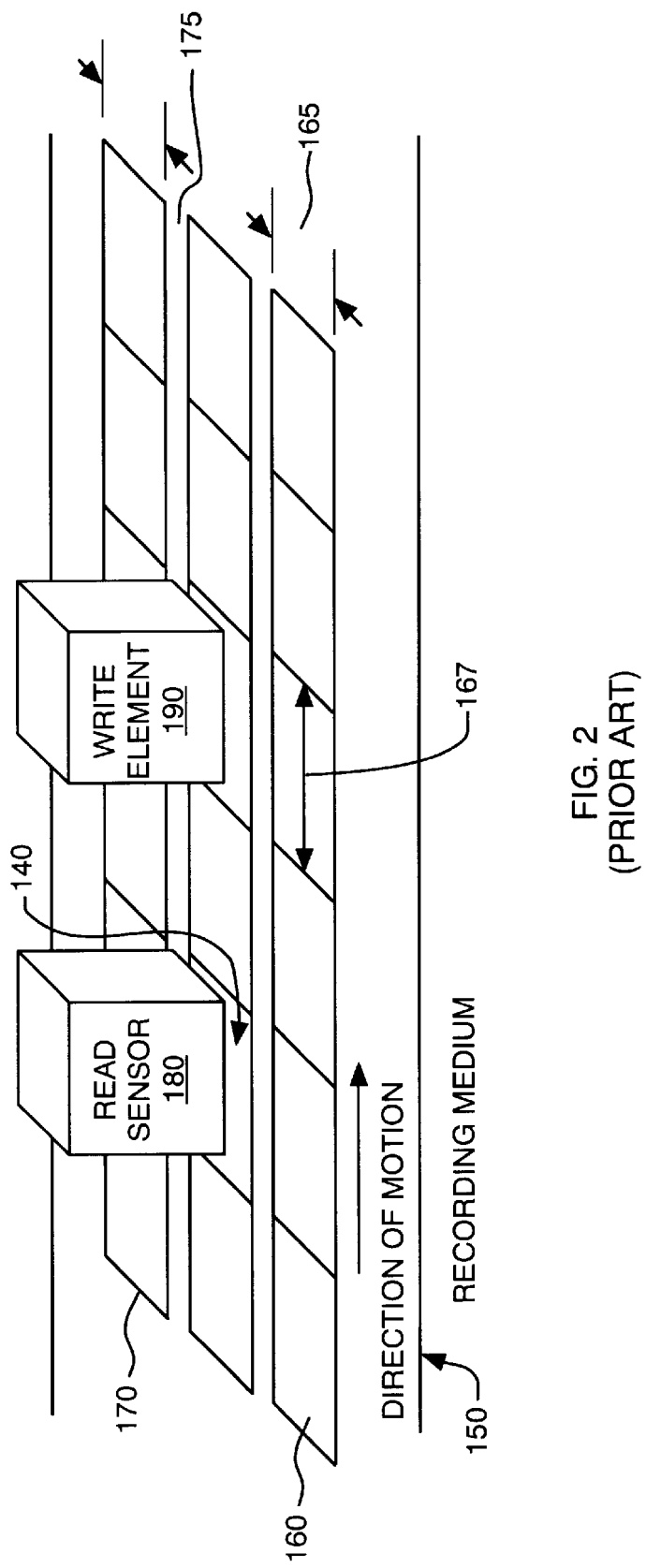
FIG. 2 shows a prior art read/write illustration of the storage cells and tracks in relation to the read/write heads FIG. 3a prior art depiction of data placement of tracks on recording medium FIG. 3b illustration of multiple subtracks in a given track increasing density of the storage medium FIG. 4a prior art disk drive depiction of the read element traversing within a single track a single storage cell FIG. 4b state of the art disk drive with a head residing within a single track but with shorter spacing of storage cells within track FIG. 4c head element covering three tracks with small guards and narrow storage cells FIG. 4d head element covering six tracks with no guards and narrow storage cells

FIG. 2 illustrates the elements of a prior art digital recording system. A planar recording medium 150 is partitioned into storage cells 160 arranged in a plurality of tracks 170. Each storage cell 160 may be set into a binary state indicating a "one" or a binary state indicating a "zero", corresponding to one bit of data. A wide variety of binary states are known in the art. For example in a magnetic recording system, a magnetized element polarized in one direction may indicate a "one" while a magnetic state polarized in the other direction may indicate "zero." Alternatively, a transition between two magnetic states might indicate a "zero" while the absence of a transition might indicate a "zero". An alternative system is to have the direction of the transition indicate the binary state. Similar states may be defined for optical systems where the presence or absence of opacity replaces the two magnetic states. Many other combinations and permutations are possible.

The storage cells 160 are generally arranged in linear or circular tracks although the explanation is the same for various formats. Generally the recording medium 150 is in motion relative to the device holding the read sensor 180 and the write element 190. This motion defines the orientation of the tracks 170. The recording medium 150 moves in the indicated direction for the described embodiment. The recording medium 150 can be a circular disk, such as a computer disk drive, CD or floppy disk, or a length of tape such as the DAT tapes used in tape drives or any other device capable of storing digital data.

Each storage cell 160 has a certain width termed the cross-track spacing 165 and a certain length termed the in-track spacing 167. The distance between each track is a buffer zone, called the guard-track spacing 175. The number of storage cells 160 on the recording medium 150 as well as the number of tracks 170 depends upon the device and the application. And, the guard-track spacing 175, cross-track spacing 165, and the in-track spacing 167, must be sufficiently large enough to allow the read sensor 180 to properly detect the data from the storage media 150 without interference from adjacent storage cells.

As discussed herein, the industry has continuously tried to decrease the spacing 165, 167, 175 to pack more data onto a storage medium 150, but have met considerable challenges in reliably storing and extracting the digital data. Design parameters include the spacing of storage cells 160 along the track 170, the separation between adjacent tracks and the width of any empty storage space between adjacent tracks. These design parameters are generally set to maximize the density of data stored on the medium 150 with the constraints of maintaining the minimum separation necessary for writing data into the storage cells without affecting data in adjacent cells. And, the minimum separation necessary for reading data from the storage cells without interference from neighboring storage cells.

A write element 190 is provided to set the binary state of any storage cell 160 on the recording medium 150. A read element 180 is provided to sense the binary state of any storage cell 160 on the recording medium 150. In all cases, means are provided to move the read and write elements 180, 190 relative to the recording medium 150 in both cross-track and in-track directions in order to access any storage cell 160 in the medium. Such systems are linked to the servo to align the read and write elements 180, 190 over a particular track 170.

A variation of moving read/write elements is to employ multiple read/write heads. As discussed in U.S. Pat. No. 6,373,648, several read/write elements are simultaneously utilized to transfer data to the medium. The heads can be used one per track or overlaid to ensure complete coverage of a region wherein the data is subsequently processed to extract the proper bits per track. The use of multiple heads is one means of extracting data simultaneously from multiple tracks in manner such that the processing would be able to discern the correct bits. However, adding heads to the system does not necessarily increase the density of the medium itself, it allows the bits to be extracted in parallel which would effect speed.

FIG. 2 also shows the read element height 140 above the recording medium 150. The height 140 is generally defined by the optical/mechanical environment and is calculated using formulae well known in the art. It should be readily apparent that decreasing the size of the storage cells 160 as well as decreasing the various spacing 165, 167, 175 between elements and tracks will place more cells beneath a particular size sensor 180, 190. Similarly, the distance 140 between the sensors 180, 190 and the recording medium 150 further establishes the viewing window or field of regard of the sensor.

In addition to the data fields shown in FIG. 2, part of the recording medium 150 is reserved for servo tracking data (not shown). For example, a prior art null-type servo magnetization pattern is described in U.S. Pat. No. 6,181,505, wherein a servo sector on the disk may include leading fields, sync or phase field, middle fields, position error field and trailing fields. Leading fields, middle fields and trailing fields may be empty or may include additional servo data. For example, leading fields can include a write recovery field and middle fields can include a track number and a sector number. The phase field may contain radially coherent magnetic transitions.

In operation, as read head 180 passes over a phase field, the magnetization pattern of the phase field induces an oscillating signal in the output of the head 180. The position error field contains a null-type magnetic pattern. The null-type magnetic pattern in position error field is written in a predetermined phase relation to the magnetic pattern in phase field. A phase-lock-loop is typically used to lock onto the phase and frequency of the oscillating signal induced by phase field and to generate a demodulating signal having a phase which is synchronized with the phase of the oscillating signal. The demodulating signal is used to demodulate the position error signal from position error field. The null-type servo pattern is written at the same frequency as the phase field and at a fixed phase relation to the phase field, and multiplying the two signals produces either a positively rectified signal or a negatively rectified signal. At the track center, the rectified signal will have zero magnitude because the position error signal is zero at the track center. If head 180 is displaced to one side of the track center, the rectified signal is positive, and if head 180 is displaced to the other side of the track center the rectified signal is negative. The phase field has also been used for automatic gain control (AGC) in order to maintain the amplitude of the readback signal in the same scale range independent of the radial position of head. Automatic gain control is used to normalize the demodulated position error to maintain the same slope (gain) in cross-track direction.

Figure 3A:
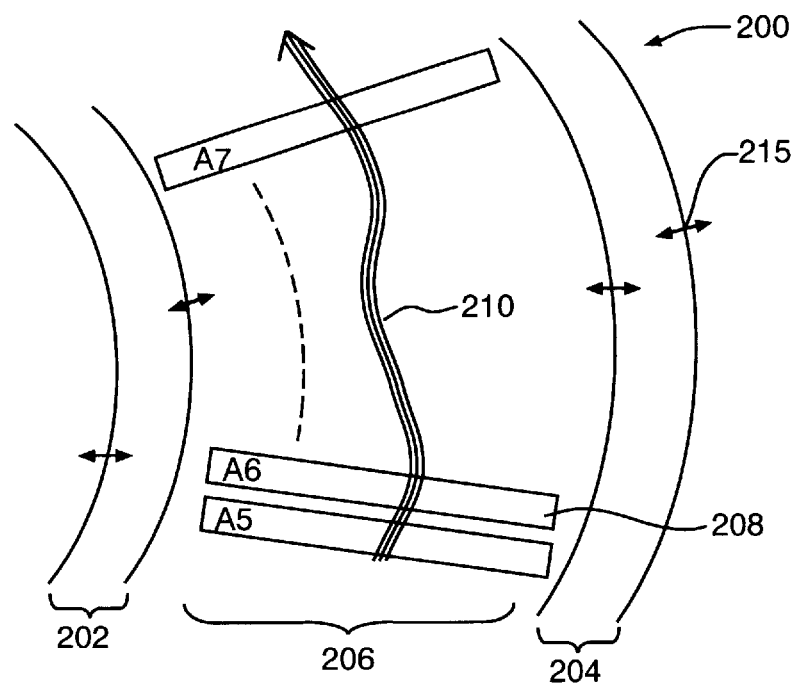

In FIG. 3a, a section of a radial disk drive is depicted over one small arc of revolution of the disk with a single track 200. The arrows schematically indicate some deviation or jitter in the actual path. The write heads between adjacent tracks are imperfect following their own flight path with accompanying wobble. The guard bands 202, 204 are used to keep the read head (not shown) from reading information on adjacent tracks in the baseline system. The data is read by rotation of the media 200 past the read head, which may follow a (relative) motion over the media as curvy path 210. The curved path 210 for the radial disk may result from the mechanical limitations in trying to place the head precisely over a fast moving track. The linear data format tends to have a more stable path as the read element does not generally need to move across the medium. The bits of information are recorded on the media 200 by altering the magnetic transitions of the disk surface in the small areas 208 in the storage cells A1-Ak. As noted, the arrows 215 indicate that the line designation for the various boundaries may deviate in their paths and have an erratic path.

Due to the radial nature of the radial disk, the regions of data 208 may or may not have different densities of bit domains depending upon the relative location of the bit domains from the center of rotation for a given arc. The serial or sequential transferring of the data along a specific serial track is taken from a head reading each of the storage cells A1-Ak along the track 210 as the track passes under the head.

Figure 3B:
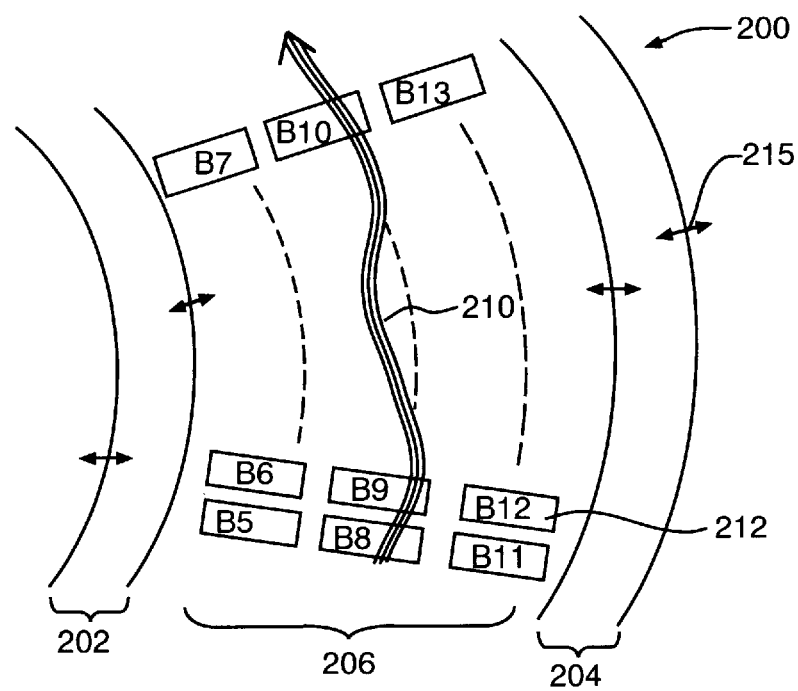

In FIG. 3b, a different geometry of disk data is presented that is one data storage embodiment of the present invention. There are still guard tracks 202, 204 in this embodiment and a data region 206, but also there are a plurality storage cells 212 called sub-tracks within a given track. These several sub-tracks 212 of information are encoded on the disk 200 thereby increasing the density of the data for a given track. The encoding can be done in the host computer central processing unit (CPU) or on the drive itself. So the Data buffer to the disk (write path) would generate the ECC, and the receiver would make repairs to the data as best it can from reading it. As the ECC stuff works in conjunction with our MUD that paradigm is perfect for our invention Note also that no special synchronization (bit alignment) is necessary amongst the sub-tracks. The sensing element (not shown) reads all the data and lets the multi-user detection processing extract the information signals from the multiple sub-tracks. Prior art systems would not tolerate reception of multiple signals with similar power response as described herein.

There are other schemes possible that can employ increased density of data bits including having the data in rows on large sections of a flexile magnetic media, which is the tape environment. In addition, another scheme has the region of simultaneously transferred data domains in rows of bit domains occupying a space and located in a radial direction outward from the center of rotation. The number of bits in any given row is dependent upon factors such as the included angle of the region of simultaneously transferred data domains, the distance (or radius) from the center of rotation, the size of a simultaneous data transfer head means, and the packing density of the data transfer transducer means on a simultaneous data transfer head means. This is in opposition of the currently practiced method of transferring one bit after another bit sequentially from a particular track, and then changing tracks, then repeating this operation until all of the data contained on the disk thereon is transferred. The usage of multiple heads to extract bits is also known in the art, and the placement and orientation of the heads in relation to the medium merely shows alternative embodiments to the present invention processing scheme. The present invention is applicable regardless of the data scheme employed, but for illustrative purposes, the more common serial data scheme for a radial drive is described.

It is known in the art that the bits can be deposited upon a substrate using various techniques such as vapor deposition using a thin film process or ion deposition processes. Current write techniques can employ write heads that have write data bits in sizes of millionths of an inch. Thus the prior art limitation was in being able to extract the data from the tightly spaced bits on the medium. For example, U.S. Pat. No. 5,448,514 discloses an atomic deposition technique for ultra high density storage capabilities. The present invention allows the capability of being able to read much greater density of data thereby allowing for the high density data writing capabilities that already exist.

Prior art FIG. 4a illustrates the prior art disk drive system and storage media with three tracks 300, 310, 320. The head element 350 traverses the media and obtains the bit information from a single storage cell, wherein the guard spacing 390 is large, the storage cell width 370 is large, and the storage cell height 380 is large. The head 350 can fit within the storage cell and have significant track-to-track head position margin. As noted, there is a track-to-track symbol phase difference among the three tracks.

The arrow indicates the direction of motion of the recording medium. The read element 350 must be properly aligned with the track 310 to read the various storage cells 360. The inter-track spacing or guard-track spacing 390, in-track spacing 380 and track width or cross-track spacing 370 defining the layout of storage cells 360 on the medium. Storage cells 360 are shown wider in the cross-track 370 direction than in the in-track direction 380 as is commonly the case with magnetic disk drives. In the reference Honda, Ouchi and Iwasaki, "Design Consideration of Ultrahigh-Density Perpendicular Magnetic recording Media IEEE Trans Magnetics volume 38 page 1615 (July 2002), the ratio is approximately five to one.

The state of the art disk drive data element pattern geometry is shown in FIG. 4b. It shows that the industry has decreased the storage cell height 380 relative to the data element size to the extent that the head 350 picks up some inter-symbol interference 330 in the process. The head 350 senses data elements primarily from a single track 310 and there is still a guard section separating the tracks. Additionally, there is generally space allocated for the servo synchronization that further decreases usable data density.

A small amount of signal is sensed from adjacent storage cells along the in-track direction that cannot be interpreted by the prior art systems. Instead, it is generally treated as unwanted additive interference. As the storage medium moves below the read element 350, the adjacent cell interference shows up as intersymbol interference (ISI) 330. A variety of signal processing techniques involving equalization and other methods may be used to mitigate intersymbol interference. The in-track data element spacing 380 is selected in light of ISI equalization performance.

Figure 4C:
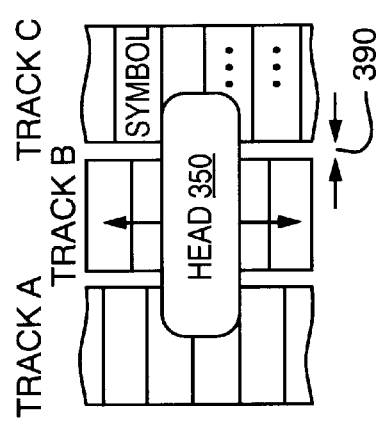

Referring to FIG. 4c, one embodiment of the present invention is depicted. While the prior art heads are concerned with alignment over a single track, the present invention allows a head 350 to sense and extract data from multiple storage cells and multiple tracks, thus permitting tightly spaced bits and tracks. A disk drive system using multiuser detection (MUD) to read the data back from magnetic media is implemented in one embodiment as follows.

1. In the physical area on the disk normally allotted to one track of recorded data, several narrower tracks, called sub-tracks, are encoded
2. Each of the sub-tracks are individually encoded with error correction coding, as is the normal practice
3. A group of sub-tracks are mutually coded, to enhance the performance of the error correction coding for certain data types
4. The control protocols and keying coded on the disk for track alignment would now apply to a group of sub-tracks.

In one embodiment, several tracks of data would be placed in the space normally allocated to one, and the read head 350 accessing the data would pick up the magnetic impulses from this ensemble of sub-tracks simultaneously. The head 350 in this application may even be a less expensive and larger head that expands across the various tracks 300, 310, and 320.

Thus, FIG. 4c shows a head element 350 sized to allow inter-track interference, multiple tracks 300, 310, 320 and multiple bits 360 of each of the tracks and still extract the desired information signals. In this case, the cross-track spacing is reduced to minimize the number of in-track interferers. While conventional read elements 350 are generally kept sufficiently small to eliminate cross track interference, the present invention does not have that limitation and densely packed tracks and bits are permitted. The head 350 is adaptable to the optimal fit and shape for the specific application. The number of tracks and bits covered by the head 350 depends on the designer, although there is a practical limitation as discussed herein.

Figure 4D:
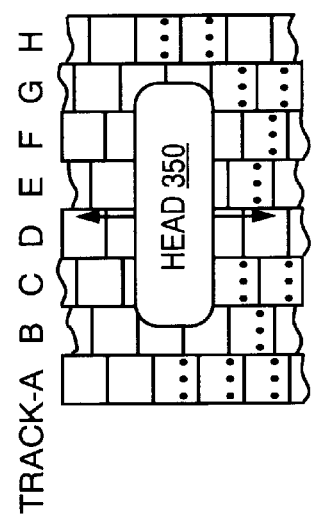

Finally, FIG. 4d illustrates one embodiment of the present invention wherein the guard bands 390 are completely eliminated and the head 350 picks up several of the six tracks displayed. The guard tracks can be spaced at some convenient location that allows grouping of six or eight tracks and provide some separation between the groupings. However, it has also been contemplated that for the densest application no guard track wold be used. This configuration allows a tightly packed storage media in which the subsequent processing of the present invention is able to extract the bit information. It also mitigates interference from faint data element residue recorded in the guard tracks during previous write operations to the track by write heads that were mis-aligned toward the direction of the guard band. The prior art discusses various forms of incorporating alignment mechanisms such as signposts of dots or stripes for reference pointers can be implemented to maintain accuracy of the system, and the alignment mechanisms of the prior art can be incorporated.

The present invention uses joint detection signal processing to simultaneously recover data from the interfering tracks and the larger read element 350 provides the additional information albeit with interference that requires signal processing. As shown herein, the density of the storage cells into sub-tracks within a given track can increase the amount of data within a standard track and the read element in combination with the multi-user detection processing can interpret the data within the subtracks. It should be readily apparent that the tracks, whether close tracks with guards, tracks that abut each other with no guard, sub-tracks, and even atomically deposited transitions can all be processed as discussed herein.

Figure 5:
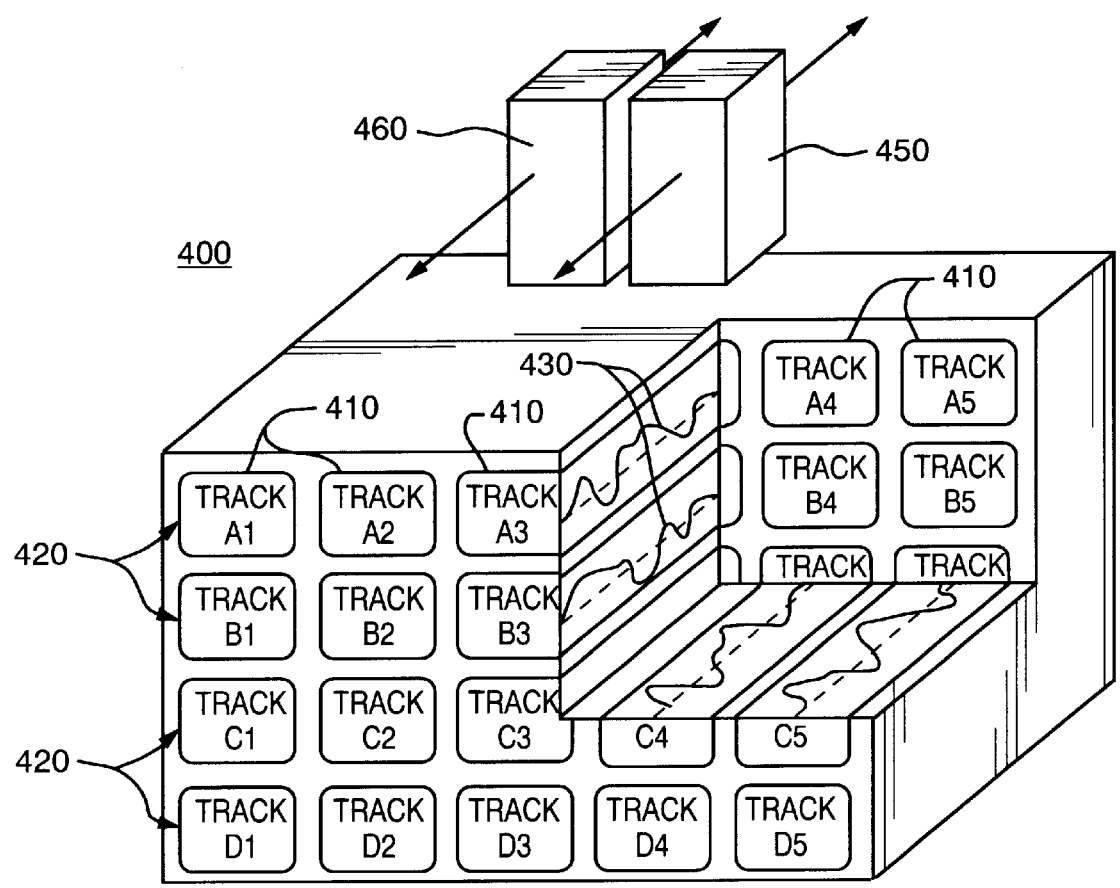
FIG. 5 illustrates multi-layer data tracks

FIG. 5 illustrates the present invention in relation to a multi-layered storage medium. For a given storage medium 400, the data is organized into 5 tracks, wherein the tracks 410 may be linear (such as a tape), circular (as in a disk topology), or other geometry. The multi-layer track topology is well known to those skilled in the art. For example, polarization may be used to separate the layers. The present invention applies where there are a plurality of tracks 410 in close proximity that limits the detection capability of the prior art devices. The state of the art multi-layered devices are optical and the layered tracks are distinguished by measuring the travel time for reflected light between the various layers. For magnetic media, the head element (not shown) could be a more focused unit that can write in a very small region and the read element would extract the data from the multiple layers.

Tracks 410 are shown being planar in nature, such as uppermost tracks A1–A5, with a total of four planar layers 420 depicted as B1–B5; C1–C5; D1–D5. Tracks 410 need not be vertically aligned for each layer 420 as shown, but may be organized in a variety of patterns appropriate for the given recording medium.

Each track 410 contains digital data encoded in waveform 430 that is deposited on the track. That encoding may take the form of quadrature phase shift key, binary phase shift key, or other commonly used keying techniques appropriate for that recording technology.

A head 450 moves along the length of a track, and picks up the combined waveforms from a series of tracks 410 due to the close proximity of the tracks with respect to each other as is known in the art. As described herein, the head elements are arranged above the tracks so that the viewing window of the head covers several tracks. Multiuser detection techniques are then used to separate the tracks from each other, and recover the data from a given track as defined herein. One or more heads 460 may be used to provide additional processing information, and reduce the mathematical processing requirements of an implementation and allow faster processing.

Thus, the multi-layer storage medium can be used to simultaneously extract the data from multiple adjacent tracks 410 using one or more heads 450, 460. Alternative embodiments include multiple heads for any given layer that simultaneously transfers data from a plurality of tracks and from a plurality of layers with the multiple heads. The present invention allows the head to extract multiple layers and multiple tracks from a single head simultaneously.

Figure 6A:
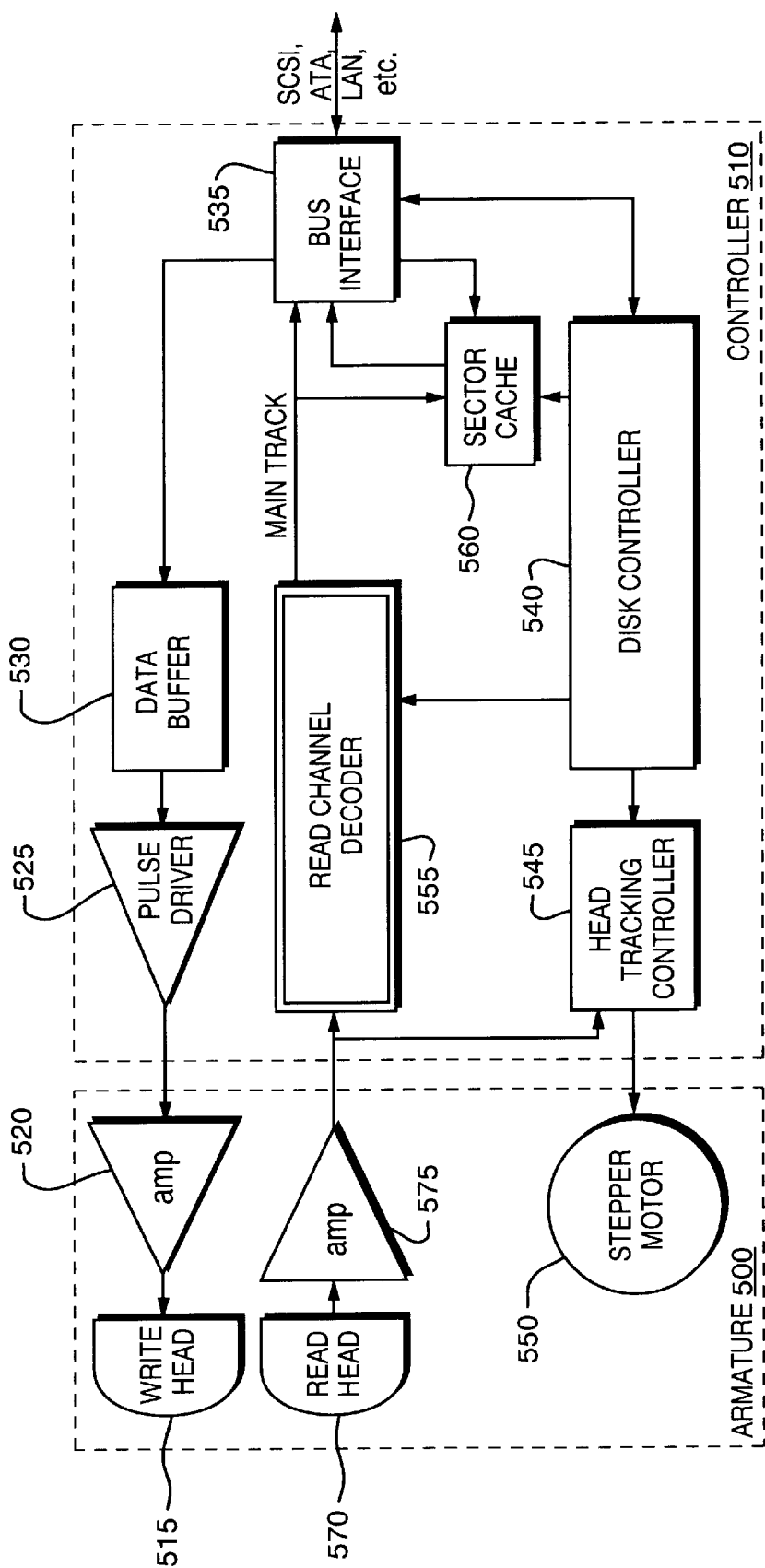
FIG. 6a is a prior art diagrammatic depiction of a disk drive architecture

FIG. 6a shows a simplified block diagram for a typical state of the art disk drive architecture including with a sector cache. The general elements include a controller section 510 and an armature section 500, wherein the armature in this embodiment has a dual read/write head. It should be readily understood that there can be separate read and write heads. In write mode, a binary input data stream is sequenced into a data buffer 530 through a bus interface 535 for the purpose of recording the information on the recording medium (not shown). Within the data buffer 530 an ECC (error correcting code) code is created and appended to the data to be written to the disk. There are a number of different bus interface protocols such as SCSI, ATA and LAN, however the actual protocol is not significant to the present invention. Using the specified input address of the recording medium as input, the disk controller 540 sequences the binary input data stream through the data buffer 530 and pulse driver 525 that output the write information to the armature amplifier 520 and write head 515. The disk controller 540 sets coordination parameters such as clocking or synchronization, and cooperates with the stepper motor 550 and head tracking controller 545 to drive the stepper motor 550 to position the write element 515 at the correct position relative to the recording medium. The stepper motor is can exist on both halves of the armature and the frame in some embodiments. The "recording medium motor" is usually called the "spindle motor", in the case of a disk drive. The binary input data stream is converted into an electrical waveform for driving the write element 515, and the write element 515 converts the electrical waveform into a field appropriate for marking the data on the recording medium.

For example, if the recording medium is a magnetic hard disk drive, the write element 515 generates a magnetic field to magnetize the appropriate storage cell on the disk in the appropriate pattern. During the write process, the control system 510 signals a recording medium servo/motor (not shown) to move the recording medium (not shown) in the appropriate trajectory relative to the write element 515. In the case of a circular recording disk, this servo/motor spins the disk at an appropriate rate. During both the read and write process the spindle motor (not shown) keeps the disk spinning at correct speed. In today's technology, that is often 5400 or 7200 RPM. In most applications, the disk is always spinning, except in power sensitive applications such as laptop disks. In the case of a linearly scanned magnetic tape, this servo/motor moves the tape to the appropriate linear position and moves it at the appropriate speed relative to the write element 515. Thus, the servo control may employ a stepper motor 550 to position the write element 515 and a servo/motor to ensure the recording medium is spinning at the proper revolutions per minute (RPM) or otherwise placing the recording medium in the proper orientation for recording. The coordination between these elements may suffer from slight misalignments resulting in recording data in a non-ideal location.

Reading binary data from the recording medium is accomplished through an inverse process. Using as input the specified output address on the recording medium, the controller 540 signals the head tracking controller 545 to drive the read servo/motor 550 to position the read element 570 at the correct position relative to the recording medium. The combined motion of the read element 570 with the recording medium is orchestrated to position the read element over the tracks of the recording medium containing the desired information signals.

The read head generates an electrical signal that is amplified 575 and is decoded into binary data by the read channel decoder 555. The read channel decoder 555 will also read the ECC bits and repair any and all errors found in the data to the limits of the ECC coding. This it done to improve the bit error rate of the disk caused by media imperfections, as well all noise, vibration, and misalignment issues in the read/write process. Certain bits from the recording medium are sent to the head tracking controller 545 to provide recording medium orientation information as is known in the art. In this embodiment, the sector cache 560 holds chunks of data that are transmitted through the bus interface 535. Prior art embodiments include a sampling circuit, signal processing and digital output circuit to create a binary data sequence from the signal sensed by the read element 570. The sector cache functionality is known in the art, and in one embodiment is an on chip microcontroller that selects the least-recently-used line to purge or otherwise process.

The disk controller 540 is typically a microprocessor based engine coupled to a host system (not shown). During a write operation, controller 540 receives a command signal from a host system through the bus interface 535 that indicates that data is to be written on a certain portion of one or more of discs. In response to the command signal, controller 540 make sure the spindle motor is running at the correct speed and signals the write controller when in the revolution of the disk to start writing the bitstream to the disk. The head tracking controller converts position request signal to an analog signal such as a current, which is amplified and is provided to the stepper motor 550. In response to the analog position signal, the disk armature/stepper motor assembly radially positions the write head 515 over the desired track.

The host system provides the user data that is to be stored to the write channel of the disk, and the data is encoded either in the host or with an encoder in the write path according to a selected encoding scheme. The write head 515 writes the encoded data including generated ECC codes in the desired track by controlling the direction of current flowing through the write head 515.

During a read operation, a host system sends a command signal to the disk controller 540 indicating that a certain portion of a disk is to be accessed. In response to the command signal, disk controller 540 provides the stepper motor 550 with a position request signal which indicates the track to be accessed. The stepper motor 550 controls the position the read head 570 in response to the position request signal, while there is a separate spindle motor controlling the disk movement.

As the read head 570 passes over the disk surface within the desired track, the magnetization patterns within the track generate a read signal in the read head 570 which contains the encoded data that was written on the disk. The read signal is amplified 575 and provided to the read channel decoder 555. In an embedded servo scheme, servo sectors are interleaved with user data sectors on the surfaces of disk, and the decoder decodes the encoded data from the read element 570 to recover the original user data, and then passes the recovered user data to the host system via the bus interface 535.

When the read head 570 passes over a servo sector on the disk, the magnetization patterns within the servo sector generate a plurality of servo bursts in the read signal that provides an indication of the position of the read head 570 within the desired track on the disc surface. The head tracking controller demodulates the servo bursts to determine the current location of the head 570 and generates a position error signal estimate that which indicates a magnitude and direction of the position error. Disk controller 540 monitors the position error signal, and based on the current location of the head 570 and the desired location on the disk, the disk control 540 re-orients the read head to the disk.

Figure 6B:
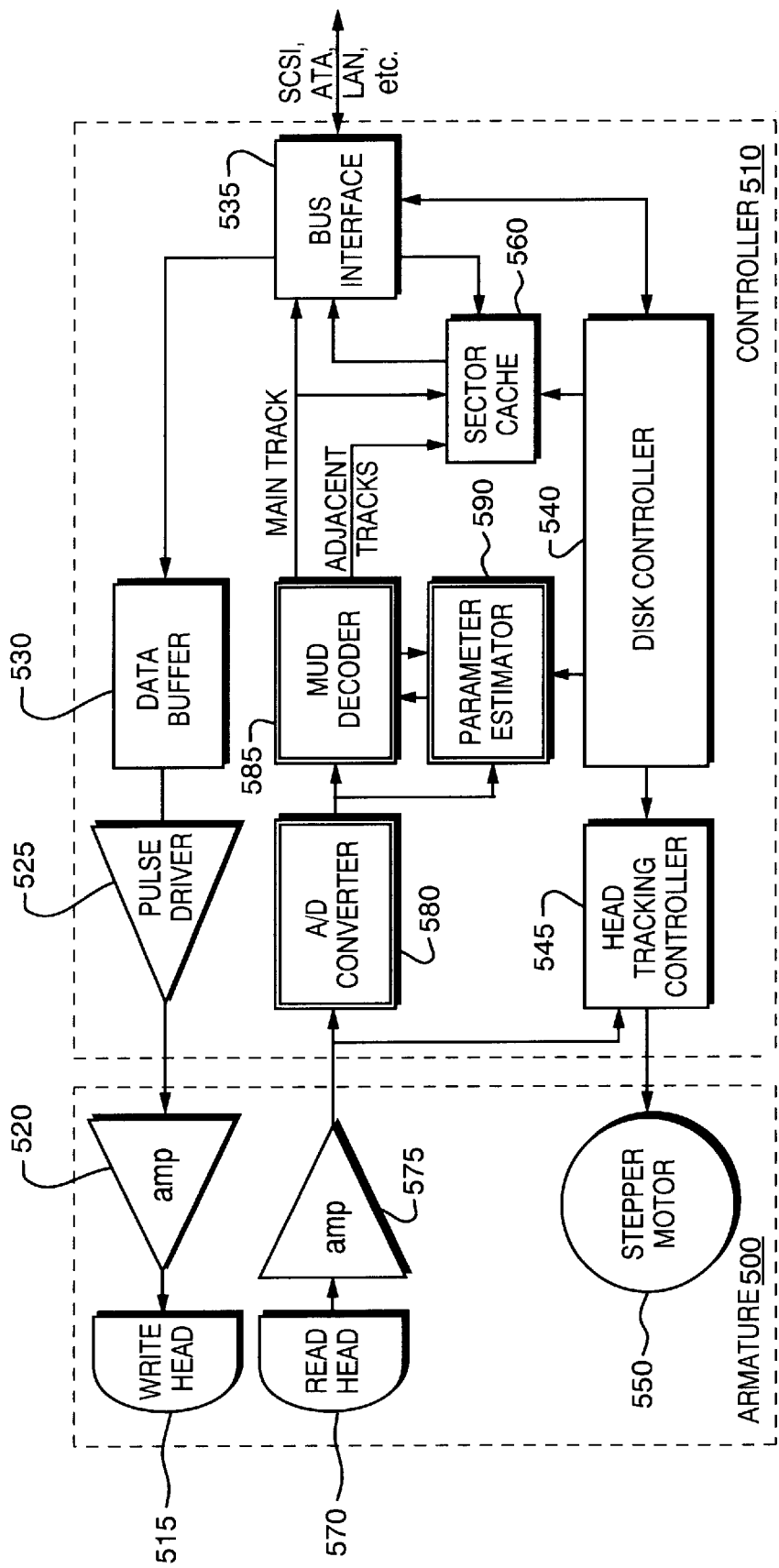
FIG. 6b is a block diagram depiction of a a disk drive architecture incorporating multiuser detection

FIG. 6b shows a MUD-Disk embodiment with several important features illustrated, wherein the description of FIG. 6a is applicable for the prior art functionality. The read channel decoder 555 is replaced with an A/D converter 580, MUD decoder 585, and parameter estimator 590 in this MUD implementation.

In one embodiment, the write operations to the disk work like a current state of the art disk. In this case, ECC codes appropriate for the disk media and MUD are appended to the data. The read head 570 detects a main track of interest along with adjacent track data. The read data is amplified 575 and converted to digital bits by an A/D converter 580. The resulting digital data is fed to the parameter estimator 590 and the MUD decoder 585, which function to separate and isolate the adjacent track information from the main track information but process all sets of information. The MUD decoder uses the ECC codes to repair errors in the data caused by traditional disk errors as well as to improve the performance of the MUD signal separation process. The main sector(s) of interest is forwarded back to the host system via the bus interface 535 as well as being directed to the disks sector cache 560. The remainder of the main track is placed in the sector cache.

Some modern disk drives read an entire track of data into cache 560 with the anticipation that the user will request other sectors on that track, so the user does not need to wait for another revolution of the disk to get the data. The present invention utilizes this concept by caching the current track data. The MUD receiver however, can also decode multiple tracks at the same time, as described herein. Not only are not-yet-requested sectors of the main track put in the sector cache, but sectors of the adjacent tracks may also put in the sector cache at the same time. This has the effect of increasing the effective data rate of the disk and improving its latency to adjacent track sectors. For optimum performance, the user may reorganize what sectors on the disk are used for what files to take further advantage this additional adjacent track prefetching.

Exemplary applications of the MUD based disk technology are RAID disk architectures. The state of the art RAID disk systems are vastly improved with the read implementation described herein, especially for the speed related RAID 0, 3, and 5 topologies.

FIGS. 7a–d show a more detailed description of the detection mechanism for one embodiment of a read processing design of the present invention. The Multi-User Detector (not shown) uses the envelope, amplitude and phase information to differentiate the multiple signals taken from the read head 600. The processing of the Multi-User Detector is used in lieu of the equalization filter of the prior art, since the envelope is different for each track.

To read data from a MUD enhanced disk drive, a normal read head could be used to cover several tracks (and possibly several layers in a multi-layer scheme) as the data would be more densely spaced as proposed herein. It is also within the scope of the present invention to have a larger read element (with respect to the size of a bit) having a greater window to cover a plurality of tracks at one time. Multiple read heads working in cooperation could also supply the simultaneous data from a number of tracks. For illustrative purposes, we will consider a standard read element with multiple sub-tracks being simultaneously processed.

Figure 7A:
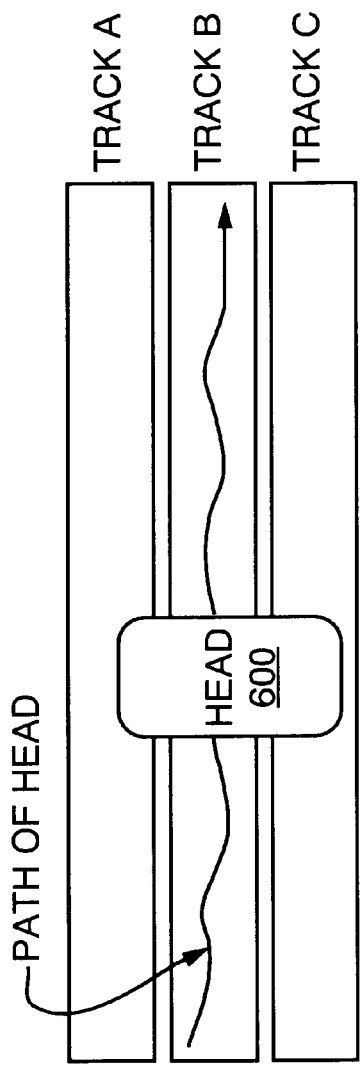
FIG. 7a shows the data head passing over multiple tracks following an erratic path FIG. 7b graphical depiction of the combined received signal envelope
Figure 7B:
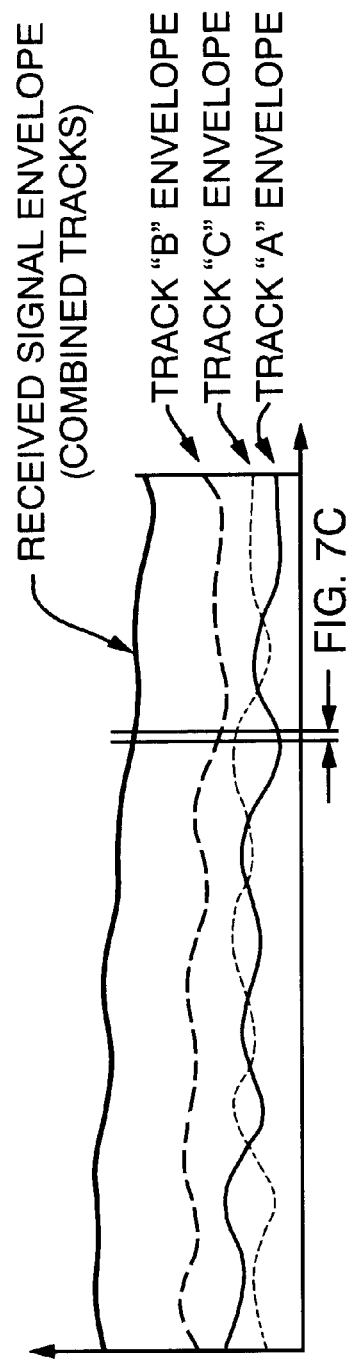
FIG. 7c is an expanded view of the combined received
FIG. 7d shows the data extracted from track A, B, and C

Referring to FIG. 7a, the read head 600 follows the curved path as shown along the three tracks, track A, track B and track C. The corresponding received signals are graphically illustrated in FIG. 7b, showing the signal envelope over time. The total received signal envelope 605 represents the combined waveforms for all three tracks, A, B, and C. The recovered signal envelopes extracted by the signal conditioner 595 through the use of multi-user detection, for each individual track are shown for track A 610, track B 615 and track C 620. As expected, track B has the highest amplitude as the head covered the entire region of the track. Tracks A and C have lesser amplitudes with corresponding phase differences.

Figure 7C:
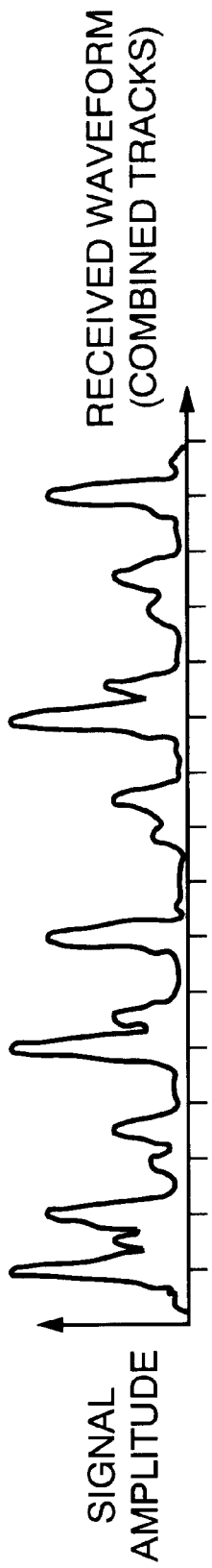
Figure 7D:
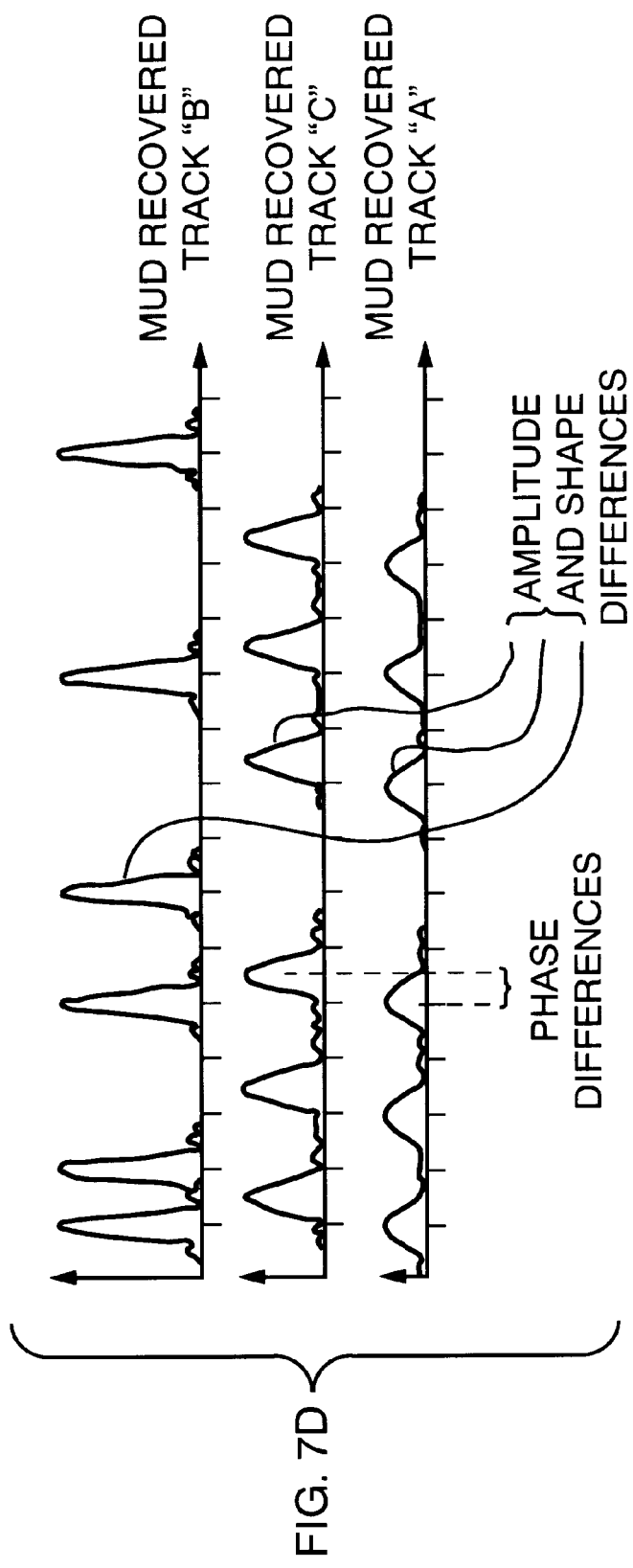

Referring to FIGS. 7c–d, the signals from FIG. 7b are expanded to show the corresponding waveforms over an expanded time interval. The composite waveform is shown in FIG. 7c, illustrating the resultant received waveform for the combined tracks. FIG. 7d shows the MUD recovered track B and the transitions depict the various bit information. Track C is shown in FIG. 7d with varying signal responses of a lesser amplitude. Finally, FIG. 7d shows the lower amplitude values for track A. The amplitude and shape differences are schematically illustrated as well as the phase differences between the waveforms.

Figure 8:
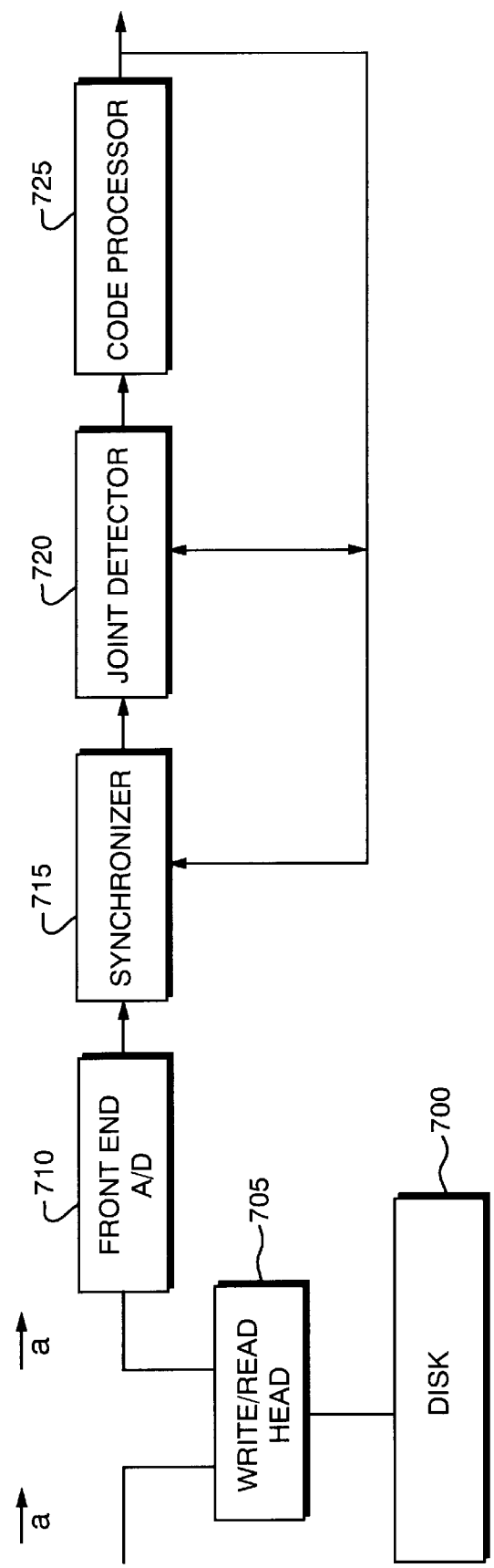
FIG. 8 shows the preferred signal conditioner design.

FIG. 8 shows the read/write processing of one embodiment. The read head 705 is used for converting to voltage the influence of the magnetic orientation of the disk 700 as it is rotated past the read head 705. The read head 705 extracts the analog voltage signals from the data on the tracks of the magnetic disk platter 700. A preamplifier is typically employed to boost the weak analog signals and can be within the read head.

In further detail, the several track signals are picked up simultaneously, generating a voltage at the read head that can be approximated by the Lorentzian model as set forth by Oenning et.al. in "Modeling the Lorentzian Magnetic Recording Channel with Transition Noise" in the IEEE Transactions on Magnetics, Vol. 37, No. 1, January 2001 as:

$$r(t) = \sum_{k=1}^{K} \sum_{i=1}^{I} a_k h(t + j_k - iT, w + w_k) + n(t).$$

The sum over 'k' represents adjacent tracks in the cross-track direction. The sum over 'i' represents adjacent pulses in the in-track direction. According to this model, the random timing fluctuations of the encoding process are reflected in the track jitter parameter $j_k$, and the random fluctuations in pulse shape due to track width fluctuations are reflected in the parameter $w_k$. T is the symbol period corresponding to the amount of time between written bits and n(t) is the additive white Gaussian noise. The bits are differentially encoded in the magnitude or the polarity of $\alpha_k$ which represents the track pulse amplitudes. Generally the magnitude of $\alpha_k$ decreases as the track k is farther away from the center track underneath the read sensor. h(t) denotes the received pulse envelope. N(t) is additive random sensor noise.

This model presumes a Lorentzian pulse shape for each recorded bit, that is $$h(t) \approx E_h \frac{D^2}{D^2 + t^2},$$

where E is the pulse energy, and D represents the pulse width, which is peaked near the center of each bit. When reading from a read sensor over the surface of a disk, the magnetic field from a dipole element dx dy gives the form of a Lorentzian, since the dipole field m(x,y) decays as $1/r^2$ with a total received field found by integrating m(x,y) over the surface data element. The Lorentzian pulse shape is thus an idealization derived from an approximate equation for the received magnetic field from little rectangular data elements on the magnetic disk.

This model is converted to a multiuser detection model by forming the received signal equation into a matrix equation as follows:

$$r(t) = \begin{bmatrix} h(t_1 + j_{k=1}) & h(t_1 + j_{k=2}) & \cdots & h(t_1 + j_{k=K}) \\ h(t_2 + j_{k=1}) & h(t_2 + j_{k=2}) & \cdots & h(t_2 + j_{k=K}) \\ \vdots & \vdots & \ddots & \vdots \\ h(t_N + j_{k=1}) & h(t_N + j_{k=2}) & \cdots & h(t_N + j_{k=K}) \end{bmatrix} \cdot \begin{bmatrix} a_1 \\ a_2 \\ \vdots \\ a_K \end{bmatrix} + n(t)$$

In this equation the dependency of the received pulses 'h' on track width fluctuations wk has been dropped for notational convenience. Also, the timing reference for each of the sub-tracks has been absorbed into the parameter 'j' as an offset, and the time 't' corresponds to $t_i = t - iT$. To retrieve the bit streams in the MUD enhanced drive, any of several MUD demodulation algorithms may suffice several of which will be described herein.

This voltage is converted to a digital stream of data by the front end 710 containing an analog to digital (A/D) converter. The front end unit 710 filters and amplifies the analog electrical signal produced by the read element as it scans the digital storage medium. For example, there can be a low pass filter (not shown) in the front end to remove some noise components. Functional equivalents to the equalizing and PLL schemes of the prior art are performed by the joint detector, synchronizer, and code processor. In one embodiment, a preamp is used to boost the relatively low level analog signals from the read element and a simple filter is used to remove extraneous noise.

The front end 710 feeds digital samples of the analog waveform into the synchronizer 715 which is also coupled to the joint detector 720 and finally coupled to a code processor providing multi-user detection of the multiple signals.

The synchronizer 710 derives certain parameters that uniquely distinguish the characteristics of each individual data element or sub-track regardless of the fact that the read head senses multiple interfering data elements at the same instant in time. These parameters are required by any data separation system having multiple chunks of data simultaneously received. In general, the received signals have a certain track transfer function comprising received power in terms of the mean pulse amplitude and phase in terms of the timing offset. The synchronizer 715 generates a track transfer function for each of the appropriate functions and for each data element, including estimates of the pulse envelope for each track.

The joint detector 720 makes preliminary estimates of the interfering digital signal values containing in the received signal. The joint detector 720 also provides updated symbol phase estimates that are fed back to the synchronizer 715. The preliminary symbol estimates produced by the joint detector 720 are also sent to a code processor 725 that uses properties of the data encoding to update the preliminary estimates. Iteration between the code processor and the joint detector 720 is often performed to refine these estimates in a methodical way, a procedure well known as iterative processing or turbo MUD. It should be readily apparent that any number of MUD techniques would be applicable to the present processing The received and digitized data streams are presented to two processing elements, the synchronizer 715 and the joint detector 720. The synchronizer 715 estimates the state of the 'S' matrix, $$S = \begin{bmatrix} h(t_1 + j_{k=1}) & h(t_1 + j_{k=2}) & \cdots & h(t_1 + j_{k=K}) \\ h(t_2 + j_{k=1}) & h(t_2 + j_{k=2}) & \cdots & h(t_2 + j_{k=K}) \\ \vdots & \vdots & \ddots & \vdots \\ h(t_N + j_{k=1}) & h(t_N + j_{k=2}) & \cdots & h(t_N + j_{k=K}) \end{bmatrix}$$

using methods known to the art. In particular, sequences of data can be written to the drive which are known to the synchronizer 715, and joint detector 720. The synchronizer and joint detector would in turn read the waveform generated by these known sequences. In this fashion, the normal MUD model of r=Sa+n in which 'r' is read, S is known, and the bits 'a' are to be computed, can be re-arranged such that 'r' is read, 'a' is known, and the matrix S is to be computed. This procedure is known as parameter estimation in the literature. For example, following the text by Kay ('Fundamentals of Statistical Signal Processing, Estimation Theory', Prentice Hall 1993), a maximum likelihood estimator could be employed. To use such a technique, several adjacent portions of the waveform could be collected, each corresponding to part of the sequence of known bits recorded. The model for the parameter estimator would then be:

$$[\vec{r}_1 \ldots \vec{r}_L] = S[\vec{a}_1 \ldots \vec{a}_L] + n$$

$$R = SA + n$$

The maximum likelihood estimator for this model would be:

$$\hat{S} = R \cdot A^H (A^H A)^{-1}.$$

The parameter estimation module, as realized in this disclosure by the synchronizer 715, is not the central issue of this invention, and as such is only briefly described here. The additional techniques described in Kay are incorporated by reference. In addition, the parameter estimation and synchronization methods of the commonly assigned patent application are also incorporated herein. In summary, it is well known in the art how to compute parameter estimates for the S matrix, and these estimates will be assumed to be known or made available to the joint detector 720.

Finally, two preferred embodiments for the format of the data encoded on the disk surface are described herein. It is typical in a disk drive scenario that several layers of error coding and protection are used to code the raw data transferred to and from the disk. In this fashion, the bits encoded on the disk in the form of the vector $\vec{a}=[A5\ A6\ \ldots\ A7]$ are related to the raw data ($\vec{b}$) by some functional 'f' with:

$$\vec{a}=f(\vec{b}).$$

There are several coding schemes known in the prior art, and the most important of these for the disk drive belong to the class of convolutional codes. In this case, the functional relationship would simply be the linear combination of selected raw data bits, modulo 2.

In a first embodiment, the sub-tracks track1=[B5, B6, . . . , B7], track2=[B8, B9, B10], etc are individually encoded from the raw data. In FIG. 3b, for example, three times as much raw data $\vec{a}$ is partitioned into three segments, individually coded, and recorded onto the sub-tracks on the drive as compared to FIG. 3a.

In a second embodiment, the sub-tracks track1=[B5, B6, . . . , B7], track2=[B8, B9, B10], etc are mutually encoded from the raw data. This could be accomplished, for example, by arranging the raw data in a 2-d matrix, and passing the data through a 2-d convolutional encoder. In this fashion, by introducing additional redundancies across time-separated portions of the raw data, an efficient means to simultaneously accomplish interleaving and convolutional encoding is achieved.

Several embodiments for the multi-user detection algorithm employed by the joint detector 720 will be described presently. One method for jointly demodulating a set of interfering digitally modulated signals would be Maximum Likelihood Sequence Estimation. Maximum Likelihood Sequence Estimation determines the most likely set of information bits for a plurality of signals. Moreover, in an article by Paul D. Alexander, Mark C. Reed, John A. Asenstorfer and Christian B. Schlagel in IEEE Transactions on Communications, vol. 47, number 7, July 1999, entitled "Iterative Multi-User Interference Reduction: Turbo CDMA," a system is described in which multiple users can transmit coded information on the same frequency at the same time, with the multi-user detection system separating the scrambled result into interference-free voice or data streams.

Multi-user detection (MUD) refers to the detection of data in non-orthogonal multiplexes. MUD processing increases the number of channels available in systems operating in an interference limited regime. The MUD section in this case jointly demodulates the various interfering sub-tracks and data from the disk.

Optimal MUD operates by comparing the received signal with the entire number of possibilities that could have resulted, one for each bit or symbol epoch. Unfortunately, this processing is a computationally complex operation and it is often not possible to accomplish in a real-time environment. Thus for those multi-user detectors that examine the entire decision space, real-time operation is often elusive. In general, optimal MUD units function by examining a number of possibilities for each bit. However, for multi-user detectors that examine a larger capacity of signal, the computations are complex and time-consuming, thus making real-time operation unobtainable. Numerous attempts at reliable pruning of the optimal MUD decision process or the use of linear approximation to the replace the optimal MUD have met with mixed results in real world environments.

There are various multiuser detectors in the prior art, including optimal or maximum likelihood MUD, maximum likelihood sequence estimator for multiple interfering users, successive interference cancellation, TurboMUD or iterative MUD, as described in reference 'Iterative Multiuser Interference Reduction: Turbo CDMA', P. Alexander, M. Reed, J. Asenstorfer, and C. Schlegel, in the IEEE Transactions on Communications, July 1999 and various linear algebra based multi-user detectors such as those detailed in the well-known text "Multiuser Detection" by Sergio Verdu.

Reduced complexity approaches based on tree-pruning help to some extent to alleviate the problems involved with optimal MUD processing. These methods work by ordering the decision process, and eliminating improper bit combinations from consideration as decisions are made. (i.e. prune improper paths in the decision tree). For example , the M-algorithm , as described in reference 'Limited Search Trellis Decoding of Convolutional Codes', J. Anderson, in the IEEE Transactions on Information Theory, September 1989, is a pruning process that limits the number of hypotheses extended to each stage to a fixed number and prunes based on ranking metrics for all hypotheses, retaining only the M most likely hypotheses. And the T-algorithm as described in reference 'Breadth-First trellis decoding with Adaptive Effort', S. Simmons, in the IEEE Transactions on Communications, January 1990 prunes hypotheses in a similar way, but compares the metrics representing all active hypotheses to a threshold based on the metric corresponding to the most-likely candidate. Performance of M-algorithm based MUD degrades as the parameter M is decreased, but M governs the number of computations required. Similar effects are seen for other tree-pruning based MUD (T-algorithm, etc). To combat improper pruning, basic tree-pruning must ensure that M is "large enough", and therefore still encounters increased complexity for acceptable performance levels.

Any of these MUD algorithms can be used as the MUD processing block in a turbo MUD algorithm. Certain options will be more amenable to this approach, but the principle will be the same in each, that turbo MUD will outperform a simple MUD/decode processor with distinct uncoupled MUD and decoding stages. The reason for the improved performance is that the processing blocks in the turbo configuration exchange information in the form of the provisional bit decisions. In the decoupled approach each processor operates autonomously without benefit of information from other processing stages. The MUD algorithm within a TurboMUD system computes estimates of the transmitted channel symbols, and passes them to a bank of single-user decoders with one decoder assigned for each user. This process proceeds for several iterations, eventually recovering the input bit streams of all transmitted signals.

Two general types of multi-user detectors within the Turbo MUD system are possible, namely those that provide hard outputs, which are discrete values, and those that provide soft outputs, which indicate both the discrete estimate and the probability that the estimate is correct. Optimal MUD, and its sub-optimal counterparts, the M or T algorithms, are examples of hard decision MUD's, since discrete bit values are under consideration at each decision point, and generated at the output of algorithms. Other MUD's, such as the matched filter, decorrelator, and minimum means squared error (MMSE) MUD are soft output MUD's, since the operators used in each are linear operations on the data.

Figure 9:
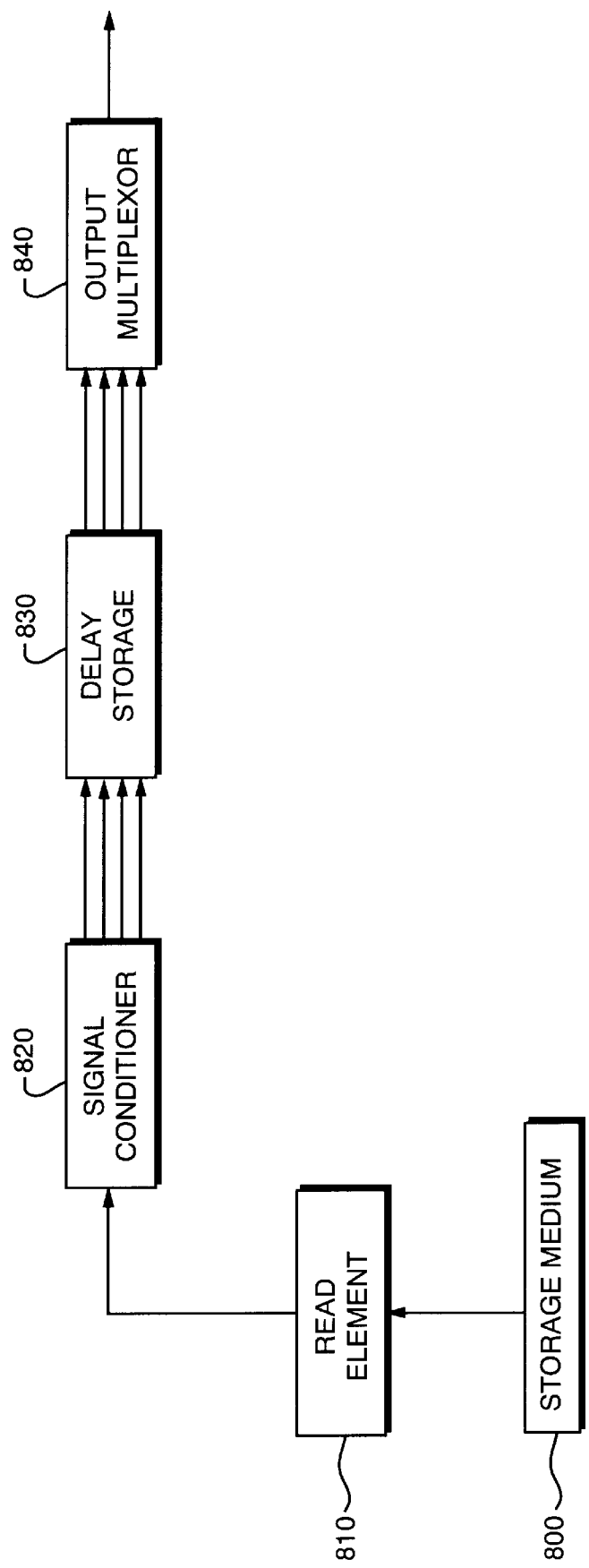
FIG. 9 shows the disk write pattern enabling parallel file access through joint detection processing.

Utilizing MUD to process multiple bits and multiple tracks and reliably extract the information data allows several variations that exploit these properties and create novel storage concepts. FIG. 9 shows a parallel buffering mechanism used on the output of the signal conditioner 820. The read element 810 senses data on the storage medium 800 designed to allow simultaneous access to multiple interfering tracks. The read element 810 converts the interfering data to an analog electrical signal containing the interfering digital waveforms. In this depiction, the signal conditioner refers to the front end unit to filter and digitize the data and the MUD units including the parameter estimator. The signal conditioner 820 recovers the digital data as described herein according to the MUD processing to produce the coherent bit stream reflecting the track data.

Track storage memory 830 is temporary storage such as a cache or buffer and is managed according to known caching techniques that write-over old data or data that is not of interest. The interfering data bits are streamed into a track storage element 830 on parallel communication channels 825, one for each interfering data stream. While there are benefits to the parallel processing, data can be streamed serially. An output multiplexor 840 accesses data from the delay storage element 830 in a manner allowing de-interleaving of the data tracks, to create a single linear data stream output. Four data tracks are de-interleaved in this example. Note that the clock rate of the multiplexor 840 is a factor 'N' higher than the clock rate of all other processing elements in the system, where 'N' is the number of interfering data streams. As a result, data is accessed 'N' times faster than the ordinary clock rate of the system. This method can be used to increase access times to the disk by a factor of 'N', or it can be used to reduce clock speeds throughout most of the digital recorder by the same factor of 'N' thereby saving power or it can be used in some combination to otherwise optimize the design.

Figure 10A:
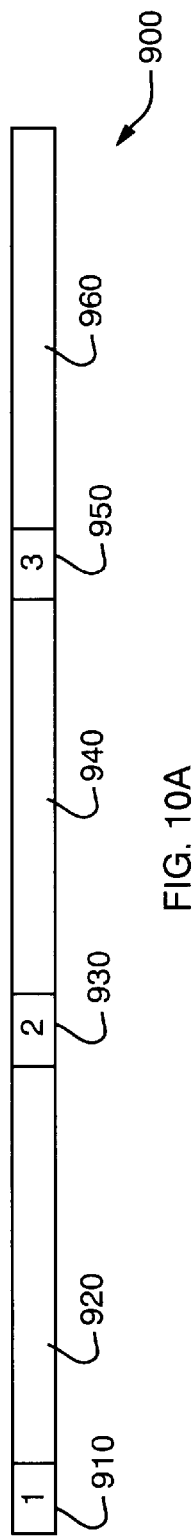
FIGS. 10a, 10b depicts the multiple track processing capabilities of the present invention
Figure 10B:
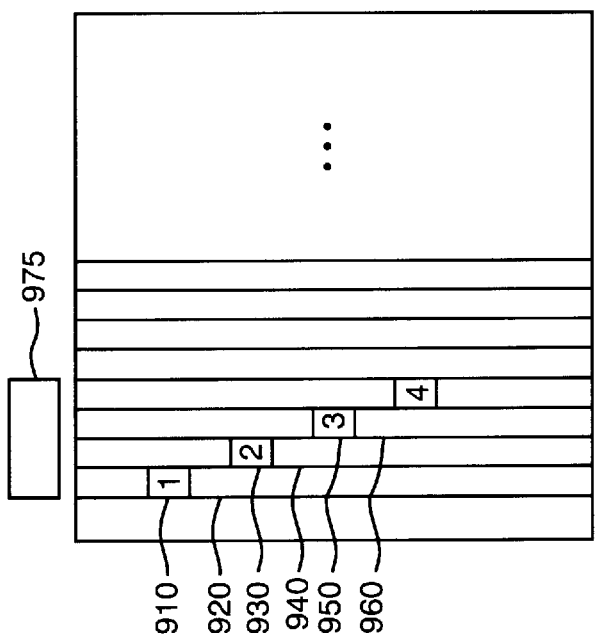

FIGS. 10a, 10b shows a disk write pattern enabling parallel file access through joint detection processing. A linear file 900 such as a picture, a video, a musical recording or a voice transmission is generally read sequentially from beginning to end. Even in random access files, there are often embedded large linear sequences where this technique also applies. Shown on the linear file are numerical markers 910, 930, 950 showing the beginning of each frame 920, 940, 960 in the file 900, wherein each frame could be a horizontal line in a picture, a horizontal line in a video, a data packet in a musical recording or a voice packet in a voice transmission. The data bits are encoded between the markers and the markers allow orientation of the system. When written to a multi-track system like a disk drive, the linear file gets rastered into a two-dimensional format as shown in FIG. 10b. The data on adjacent tracks is often closely related. For example, it could be data to be used a few seconds later in the musical recording or the video. The read element 975 shows the extent of the file that could be read in a single access using a read element 975 capable of demodulating four tracks simultaneously. The ability to read data from multiple data tracks simultaneously and to incorporate a caching mechanism allows for large bandwidth applications such as movies, and is well within the scope of the invention.

Figure 11:
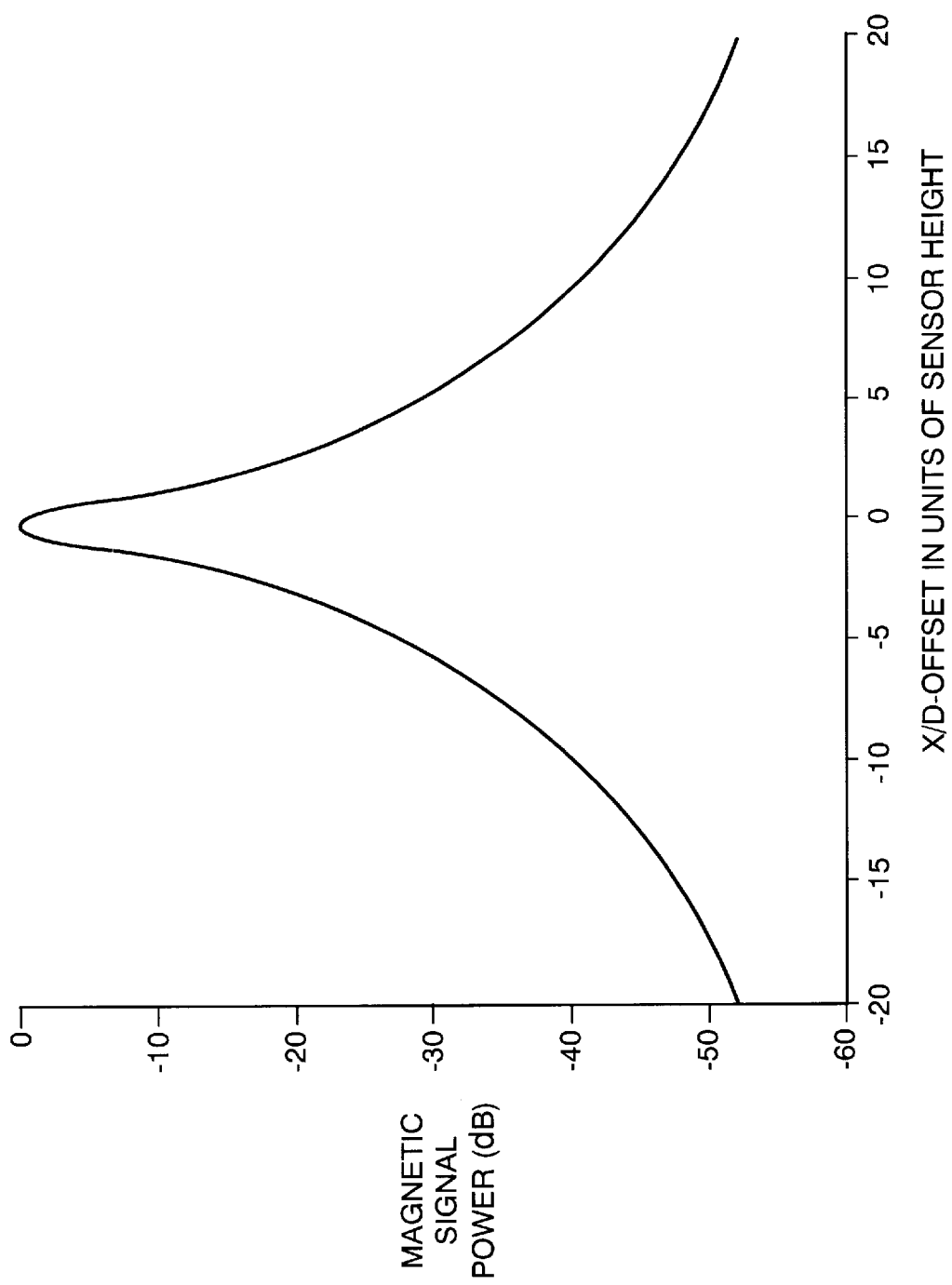
FIG. 11 shows the magnetic field sensed by a magnetic read head from an isolated track element as a function of offset in the cross track direction.

FIG. 11 graphically illustrates a modeled magnetic field sensed by a magnetic read head from an isolated track element as a function of offset in the cross track direction (x/d). Offset dimensions are given as a ratio of the offset distance x divided by the read element height d as defined herein. The −20 dB point of magnetic signal power occurs at about x/d=3. These curves may be used to set the read head height and the inter-track spacing in order to control the number of tracks received simultaneously by the read head.

TABLE A

| Track | Inter-track spacing in terms of track spacing/head height | | | | | |
|---|---|---|---|---|---|---|
| | 0.1 | 0.2 | 0.5 | 1 | 2 | 5 |
| 1 | 0.00 | 0.00 | 0.00 | 0.00 | 0.00 | 0.00 |
| 2 | −0.17 | −0.65 | −3.17 | −7.75 | −14.09 | −22.96 |
| 3 | −0.50 | −1.83 | −7.42 | −14.86 | −22.84 | −32.36 |
| 4 | −0.98 | −3.34 | −11.43 | −20.20 | −28.67 | −38.35 |
| 5 | −1.57 | −5.03 | −14.93 | −24.35 | −33.03 | −42.77 |
| 6 | −2.27 | −6.76 | −17.94 | −27.73 | −36.52 | −46.29 |
| 7 | −3.03 | −8.46 | −20.56 | −30.57 | −39.42 | −49.21 |
| 8 | −3.85 | −10.11 | −22.87 | −33.02 | −41.91 | −51.71 |
| 9 | −4.69 | −11.67 | −24.92 | −35.17 | −44.08 | −53.89 |
| 10 | −5.55 | −13.15 | −26.77 | −37.08 | −46.01 | −55.82 |
| Total above −25 dB | 20+ | 20+ | 18 | 9 | 5 | 3 |

Table A shows a modeled total received signal from tracks as a function of track spacing in units of x/d where x=track spacing and d=sensor height. The table shows that choosing 'd' such that x/d=2, produces five interfering tracks. It indicates the practical limits associated with expanding the viewing window of the read/write element to multiple tracks. For example, a designer could select x/d=½ to sense two adjacent tracks with received power levels of approximately −3 dB relative to the center track and two more adjacent tracks with received power levels of approximately −7 dB. The remaining interfering tracks could be suppressed through placement of an empty guard track between every five tracks.

Numerous characteristics and advantages have been set forth in the foregoing description, together with details of structures and functions of the present invention, and some of the novel features thereof are pointed out in appended claims. The disclosure, however, is illustrative only, and changes may be made in arrangement and details, within the principle of the invention, to the full extent indicated by the broad general meaning of the terms in which the appended claims are expressed.

The objects and advantages of the invention may be further realized and attained by means of the instrumentalities and combinations particularly pointed out in the appended claims. Accordingly, the drawing and description are to be regarded as illustrative in nature, and not as restrictive.

What is claimed is:

1. An apparatus for reading data bits from a storage medium using multi-user detection, comprising:

a plurality of tracks wherein said data bits reside within a plurality of storage cells on said tracks;

at least one read element simultaneously detecting a plurality of said tracks and converting said data bits into a plurality of electrical signals;

a front end unit processing said electrical signals and converting said electrical signals into a plurality of digital bits;

a parameter estimator coupled to said front end unit for identifying a track transfer function for said plurality of tracks; and a multi-user detector coupled to said parameter estimator and said front end unit for separating said tracks and reading said data bits.

2. The apparatus according to claim 1, wherein said storage medium is selected from the group consisting of: floppy disks, hard disks, cubical disks, linear disks, multi-level disks, drum memory, linear tapes, helical scanned tapes, radial disks, compact disks, digital video disks, magneto optical disks, and rotating magnetic media.

3. The apparatus according to claim 1, wherein said data bits are stored on said storage medium by a storage technology selected from at least one of the group consisting of: magnetic, optical, magneto optical, electrostatic, and quantum.

4. The apparatus according to claim 1, wherein said track transfer function includes envelope information of a shape, amplitude and phase of each of said plurality of data tracks.

5. The apparatus according to claim 1, wherein said digital bits are represented by a Lorentzian pulse shape.

6. The apparatus according to claim 1, wherein symbols on said disk represent a plurality of said data bits.

7. The apparatus according to claim 6, wherein said symbols use codings selected from at least one of the group consisting of: quadrature phase shift keying (QPSK), binary phase shift keying (BPSK), Code Division Multiple Access (CDMA), quadrature amplitude modulation (QAM), Frequency Division Multiple Access (FDMA), and Time Division Multiple Access (TDMA) amplitude modulation (AM).

8. The apparatus according to claim 1, further comprising a guard-track spacing providing a separation between adjacent tracks.

9. The apparatus according to claim 1, wherein said plurality of data tracks are proximate each other without a guard-track spacing.

10. The apparatus according to claim 1, wherein said front end unit comprises a preamplifier, a low pass filter and an analog-to-digital converter.

11. The apparatus according to claim 1, wherein said data tracks are multi-layered.

12. The apparatus according to claim 1, further comprising a temporary storage buffer and an output multiplexor coupled to said multi-user detector.

13. The apparatus according to claim 1, wherein said multi-user detector is selected from at least one of the group consisting of: maximum likelihood MUD, TurboMUD, and linear algebra based multi-user detector.

14. The apparatus according to claim 1, wherein said multi-user detector uses an algorithm selected from at least one of the group consisting of: M-algorithm, T-algorithm, and MT-algorithm.

15. The apparatus according to claim 1, further comprising a filter unit coupled to said multi-user detector.

16. The apparatus according to claim 15, wherein said filter unit is selected from the group consisting of: whitening matched filter bank and matched filter bank.

17. The apparatus according to claim 1, further comprising a sector cache coupled to said multi-user detector.

18. The apparatus according to claim 1, wherein a sector is a plurality of data bits in one of said tracks, said tracks have a main track and adjacent tracks proximate said main track, and wherein said apparatus further comprises a temporary storage memory unit for storing each said sector for each of said adjacent tracks.

19. The apparatus according to claim 18, wherein each said sector from said adjacent tracks are combined with at least one sector from said main track and placed in a sector cache.

20. The apparatus according to claim 18, wherein each said sector from said adjacent tracks are organized proximate each other in a host computer.

21. The apparatus according to claim 1, wherein said data bits are written to said disk using a set of convolutional codes.

22. The apparatus according to claim 1, further comprising a head tracking controller generating head position error information, and wherein said head position error information is communicated to said parameter estimator.

23. The apparatus according to claim 1, wherein a phase of said data bits between said tracks is controlled when written to said disk.

24. The apparatus according to claim 1, wherein apriori information of said data bits is communicated to said parameter estimator.

25. The apparatus according to claim 1, wherein said parameter estimator calculates information about said tracks.

26. The apparatus according to claim 18, wherein said temporary storage unit contains prefetch data from said adjacent tracks.

27. The apparatus according to claim 1, wherein said at least one read element takes at least one pass over said tracks.

28. The apparatus according to claim 27, wherein at least one of said plurality of analog signals are processed from some read element.

29. A method for processing data bits of a storage medium, comprising:

reading a plurality of analog signals corresponding to said data bits from a main track and adjacent tracks of said storage medium;

digitizing said analog signals into digital data;

generating a track transfer function of said digital data, wherein said digital data is in a Lorentzian form; and demodulating said digital data using said track transfer function.

30. The method according to claim 29, further comprising a plurality of read elements reading said plurality of analog signals.

31. The method for according to claim 29, further comprising the at least one additional step of reading said main track and said adjacent tracks.

32. The method according to claim 29, further comprising filtering said digital data.

33. A system for reading data from a storage medium, comprising:

a storage surface on said storage medium having encoded data bits defined by in-track spacing and cross-track spacing, wherein said encoded data bits are stored in a plurality of data tracks;

a means for positioning at least one read element over said storage surface, wherein said read element simultaneously detects said encoded data bits from at least one of said tracks;

a means for conditioning said encoded data bits from said read element; and a means for demodulating said conditioned encoded data bits from said tracks, wherein said means for demodulating discriminates said data track transfer function that includes envelope information of a shape, amplitude and phase of each of said data track.

34. The system according to claim 33, wherein said track transfer function is Lorentzian.

35. The system according to claim 33, wherein said plurality of data tracks are proximate each other without a guard-track spacing.

36. The system according to claim 33, wherein said adjacent tracks are multi-layered.

37. The system according to claim 33, further comprising a temporary storage buffer and an output multiplexor coupled to a multi-user detector.

38. An apparatus for reading and writing digital data, comprising:

a storage medium wherein said digital data is represented in a plurality of storage cells on a plurality of tracks, each of said storage cells having an in-track spacing and a cross-track spacing;

at least one read sensor oriented to capture said digital data from at least one storage cell from at least one track;

a write element oriented to write said digital data to said storage cell;

a servo system coupled to said read sensor, said write element and said storage medium;

a system controller coupled to said servo system; and a signal conditioner coupled to said read sensor, wherein said signal conditioner comprises a front end unit, a parameter estimator, and a joint detector for processing said digital data from said at least one track and identifying a track transfer function for said track.

39. The apparatus according to claim 38, wherein said read sensor is stationary and said storage medium is moveable.

40. The apparatus according to claim 38, wherein said read sensor is moveable and said storage medium is stationary.

41. The apparatus according to claim 38, wherein said read sensor is moveable and said storage medium is moveable.

* * * * *